US012597402B2

(12) United States Patent
Muramatsu et al.

(10) Patent No.: US 12,597,402 B2
(45) Date of Patent: Apr. 7, 2026

(54) INFORMATION PROCESSING DEVICE, INFORMATION PROCESSING METHOD, AND PROGRAM FOR APPLICATION WINDOW HAVING FIRST DISPLAY MODE AND SECOND DISPLAY MODE

(71) Applicant: Sony Group Corporation, Tokyo (JP)

(72) Inventors: Seiji Muramatsu, Tokyo (JP); Hiroaki Adachi, Tokyo (JP); Kenji Yokoyama, Tokyo (JP); Naoki Iwata, Tokyo (JP); Hiroaki Kuriyama, Tokyo (JP); Yukako Murakami, Tokyo (JP); Kazuki Kozuma, Tokyo (JP); Toshiyuki Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 248 days.

(21) Appl. No.: 18/551,877

(22) PCT Filed: Feb. 14, 2022

(86) PCT No.: PCT/JP2022/005577
§ 371 (c)(1),
(2) Date: Sep. 22, 2023

(87) PCT Pub. No.: WO2022/209350
PCT Pub. Date: Oct. 6, 2022

(65) Prior Publication Data
US 2024/0203377 A1 Jun. 20, 2024

(30) Foreign Application Priority Data
Mar. 31, 2021 (JP) ................................ 2021-061829

(51) Int. Cl.
*G09G 5/14* (2006.01)
*G06F 3/04817* (2022.01)

(52) U.S. Cl.
CPC ........... *G09G 5/14* (2013.01); *G06F 3/04817* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| | | | | | |
|---|---|---|---|---|---|
| 5,767,850 A | * | 6/1998 | Ramanathan | ......... | G06F 3/0482 715/810 |
| 2003/0107604 A1 | * | 6/2003 | Ording | ................. | G06F 3/0486 715/788 |

(Continued)

FOREIGN PATENT DOCUMENTS

| | | |
|---|---|---|
| CN | 108540646 A | 9/2018 |
| JP | H08-123655 A | 5/1996 |

(Continued)

OTHER PUBLICATIONS

International Search Report and Written Opinion mailed on Apr. 26, 2022, received for PCT Application PCT/JP2022/005577, filed on Feb. 14, 2022, 10 pages including English Translation.

*Primary Examiner* — Zhengxi Liu

(74) *Attorney, Agent, or Firm* — XSENSUS LLP

(57) ABSTRACT

An information processing device includes a display control unit that displays an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and wherein the display control unit displays a first window having a fixed position and a fixed size as the application window in the first display mode, and displays a second (Continued)

window having a variable position and a variable size as the application window in the second display mode.

15 Claims, 21 Drawing Sheets

(56) References Cited

U.S. PATENT DOCUMENTS

| | | | |
|---|---|---|---|
| 2005/0283804 A1* | 12/2005 | Sakata | H04N 21/4332 |
| | | | 725/38 |
| 2013/0061123 A1* | 3/2013 | Rochelle | G06F 16/951 |
| | | | 715/220 |
| 2013/0132906 A1* | 5/2013 | Siurumaa | G06F 3/04817 |
| | | | 715/835 |
| 2014/0190027 A1* | 7/2014 | Abe | G01B 5/008 |
| | | | 33/503 |
| 2014/0195965 A1* | 7/2014 | Brunet | G06F 3/04817 |
| | | | 715/784 |
| 2015/0121284 A1 | 4/2015 | Wang | |
| 2016/0099920 A1* | 4/2016 | Meuleman | H04L 63/18 |
| | | | 713/153 |
| 2016/0370864 A1* | 12/2016 | Choi | G06F 3/0481 |
| 2017/0300180 A1* | 10/2017 | Louch | H04L 67/10 |
| 2018/0246634 A1* | 8/2018 | Suh | G06F 3/1423 |

FOREIGN PATENT DOCUMENTS

| | | | |
|---|---|---|---|
| JP | H11-237943 A | 8/1999 | |
| JP | 2001-290574 A | 10/2001 | |
| JP | 2014-508354 A | 4/2014 | |
| JP | 2014186736 A | 10/2014 | |
| JP | 2015-011398 A | 1/2015 | |
| JP | 2017527882 A | 9/2017 | |
| WO | 2020/170461 A1 | 8/2020 | |

* cited by examiner

INFORMATION PROCESSING DEVICE, INFORMATION PROCESSING METHOD, AND PROGRAM FOR APPLICATION WINDOW HAVING FIRST DISPLAY MODE AND SECOND DISPLAY MODE

CROSS-REFERENCE TO RELATED APPLICATIONS

The present application is based on PCT filing PCT/JP2022/005577, filed Feb. 14, 2022, which claims priority from Japanese Patent Application No. 2021-061829, filed Mar. 31, 2021, the entire contents of each are incorporated herein by reference.

FIELD

The present disclosure relates to an information processing device, an information processing method, and a program.

BACKGROUND

In recent years, an information processing device (for example, a smartphone) having a display screen such as a touch panel display has been actively developed. In the information processing device, a plurality of applications can be opened at a time. For example, in recent years, smartphones capable of dividing a display screen and displaying different applications at a time have been on the market.

CITATION LIST

Patent Literature

Patent Literature 1: WO 2020/170461 A

SUMMARY

Technical Problem

However, even when it is possible to open a plurality of applications at a time, an inconvenient situation may occur for the user. For example, it is assumed that a user divides a longitudinal display screen into two parts of upper and lower parts and displays different application screens in the upper and lower parts. At this time, when a notification of message arrival is made on the display screen, the user is required to open the message application by releasing the current setting of two divided parts of upper and lower parts in some cases in order to view the message. In this case, after the user has finished viewing the message, the user has to start the division setting of the display screen again, which causes inconvenience.

Therefore, the present disclosure proposes an information processing device, an information processing method, and a program with high convenience.

Solution to Problem

In order to solve the above problem, an information processing device according to one embodiment of the present disclosure includes: a display control unit that displays an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and wherein the display control unit displays a first window having a fixed position and a fixed size as the application window in the first display mode, and displays a second window having a variable position and a variable size as the application window in the second display mode.

DESCRIPTION OF EMBODIMENTS

Figure 1:
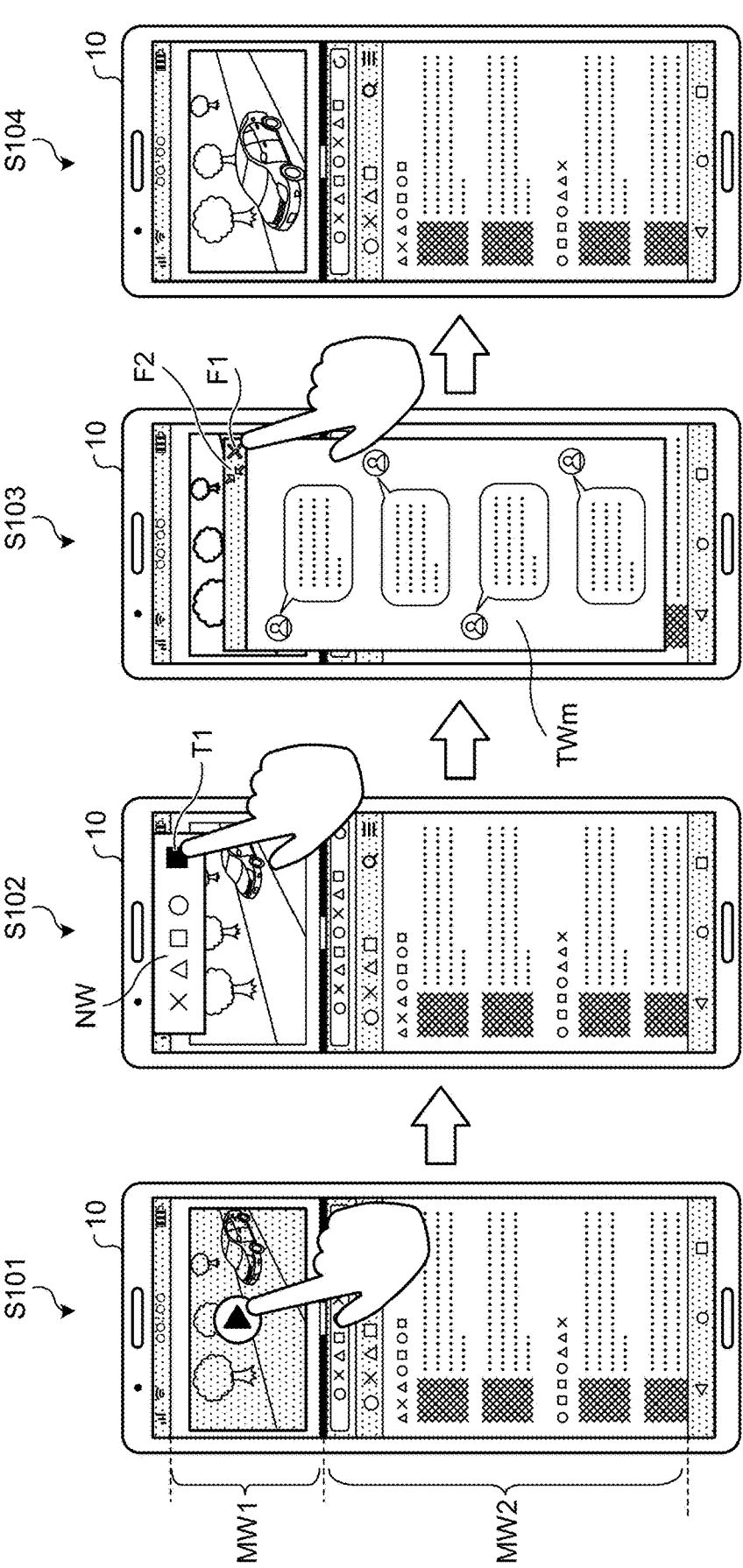
FIG. 1 is a diagram for explaining an outline of a TWm mode.

Hereinafter, the embodiments of the present disclosure will be described in detail with reference to the drawings. In the following embodiments, the same parts are denoted by the same reference signs, and a duplicate description will be omitted.

Further, the present disclosure will be described in the order of the following items.

1. Outline of present embodiment
   1-1. Outline of TWm mode
   1-2. Outline of TWs mode
2. Configuration of terminal device
3. Method of displaying application screen
   3-1. Single window
   3-2. Multi-window
4. Operation of terminal device
   4-1. Temporary window
   4-2. Activation and mode transition
   4-3. Change in display aspect by position of window
5. Modification
6. Conclusion

1. OUTLINE OF PRESENT EMBODIMENT

A terminal device such as a smartphone may have a function of enabling a plurality of application screens to be displayed on a display screen (display) at a time. For example, a recent smartphone may have a function (hereinafter, it is referred to as a multi-window) of dividing a display screen into a plurality of screens and displaying screens of different applications on the respective divided screens.

However, even when a plurality of applications can be opened at a time, a situation that is inconvenient for the user occurs. For example, it is assumed that the user performs setting to divide a longitudinal display screen into two parts of upper and lower parts, and displays different application screens in the upper and lower parts. At this time, when there is an interrupt notification of message arrival on the display screen, the user is required to release the current display state of the multi-window in some cases in order to view the message. For example, it is assumed that a message application for viewing a message is an application not allowed to be displayed in a multi-window (for example, an application in which non-resizable is set). In this case, the current multi-window setting is reset as soon as the user opens the message application. In this case, the user has to redo the multi-window setting from the beginning in order to return the display to the original state after finishing viewing the message.

Therefore, in the present embodiment, a new application window can be displayed in a superimposed manner on the current application screen while the display state of the application screen is maintained. The user performs a temporary operation (for example, viewing a message or replying to a message) using the application window displayed in a superimposed manner. To return the display screen to the original display state, the user is only required to close the application window used for the temporary operation.

Note that, in the following description, a new application window displayed in a superimposed manner on the current application screen is referred to as a temporary window. Note that, in the following description, a temporary window may be abbreviated as a TW. The temporary window is a temporary name for describing the present embodiment, and the name is not limited to the temporary window. For example, the temporary window may be referred to as another name such as a pop-up window.

In addition, the application window behind the temporary window may be referred to as a main window. That is, the main window is an application window in which the current application screen before the temporary window is displayed is displayed, and is, for example, an application window located in the lowest layer.

The terminal device according to the present embodiment includes at least two display modes as the display mode of the temporary window. One mode is a TWm mode (first display mode) in which an application window (first window) having a fixed position and a fixed size is displayed in a superimposed manner on the current application screen, and the other mode is a TWs mode (second display mode) in which an application window (second window) having a variable position and a variable size is displayed in a superimposed manner on the current application screen. These two display modes are different in a display aspect of an application window. Hereinafter, an outline of the TWm mode and the TWs mode will be described with reference to the drawings.

<1-1. Outline of TWm Mode>

First, the TWm mode (first display mode) will be described.

The TWm mode is a mode intended to allow the user to temporarily perform an operation while maintaining the display state of the current application when an interruption occurs during an operation with the current application screen. As described above, in the TWm mode, the application window (first window) having a fixed position and a fixed size is displayed in a superimposed manner on the current application screen. After the operation, when the user closes the first window, the display screen returns to the original display state. Note that, in the following description, the first window may be referred to as a temporary window TWm.

FIG. 1 is a diagram for describing an outline of the TWm mode.

A state S101 in FIG. 1 illustrates a state of a terminal device 10 before the temporary window TWm is displayed. In the example of the state S101, the display screen of the terminal device 10 is in a multi-window state of two divided parts of upper and lower parts. A video application is displayed in an upper application window (hereinafter, referred to as a main window MW1), and a browser application is displayed in a lower application window (hereinafter, referred to as a main window MW2). In the example of the state S101, the user operates the browser in the main window MW2 while replaying the video in the main window MW1.

State S102 in FIG. 1 indicates a state in which a notification window NW for message arrival is displayed on the display screen. In the notification window NW, an activation button T1 for opening the message application is displayed. When the user taps the activation button T1, the terminal device 10 displays the temporary window TWm (first window) in a superimposed manner on the main windows MW1 and MW2.

A state S103 in FIG. 1 illustrates a state in which the temporary window TWm is displayed in a superimposed manner on the main windows MW1 and MW2. The temporary window TWm is an application window with which the user temporarily performs an operation, and largely occupies the display screen of the terminal device 10.

When the application is not displayed on the display screen, the application may stop its operation. For example, when the video application is not displayed on the display screen, the video application wastefully consumes the battery, and thus stops its operation. However, in the present embodiment, the terminal device 10 displays the temporary window TWm so that the user can visually recognize part of the application screen displayed in the main window. In the example of the state S103, part of the video application displayed in the main window MW1 is displayed on the display screen. Therefore, even when the temporary window TWm is displayed, the execution of the application is continued. As a result, for example, it is possible to prevent a situation in which the replay of the operation is stopped as soon as the message application is opened while performing an operation while listening to the sound of the video.

In the temporary window TWm, one of the end regions is a bar region (hereinafter, referred to as a navigation bar). In the example of the state S103, the upper end region of the temporary window TWm is a navigation bar. One or a plurality of function icons is disposed on the navigation bar. Since the temporary window TWm has a fixed position and a fixed size, it is assumed that many function icons are not required. Therefore, in the example of the state S103, only a function icon F1 and a function icon F2 are disposed in the navigation bar.

A state S104 in FIG. 1 indicates a state in which the temporary window TWm is closed. When the user presses the function icon F1, the temporary window TWm of the terminal device 10 is closed. Here, the function icon F1 is an icon (close button) for closing the temporary window. As a result, the display screen returns to the display state of the original application. In the example of the state S104, the application screen behind the temporary window TWm is displayed in the original multi-window state.

As a result, the user can easily return to the original display state without performing the display setting again after finishing the temporary operation with the temporary window TWm.

<1-2. Outline of TWs Mode>

Next, the TWs mode (second display mode) will be described.

The TWs mode is a mode intended to allow the user to perform an operation on the original application while leaving the new application displayed in a superimposed manner on the original application screen. As described above, in the TWs mode, the application window (second window) having a variable position and a variable size is displayed in a superimposed manner on the current application screen. The user can freely change the position and the size of the second window to balance display with the original application screen. Note that, in the following description, the second window may be referred to as a temporary window TWs.

Figure 2:
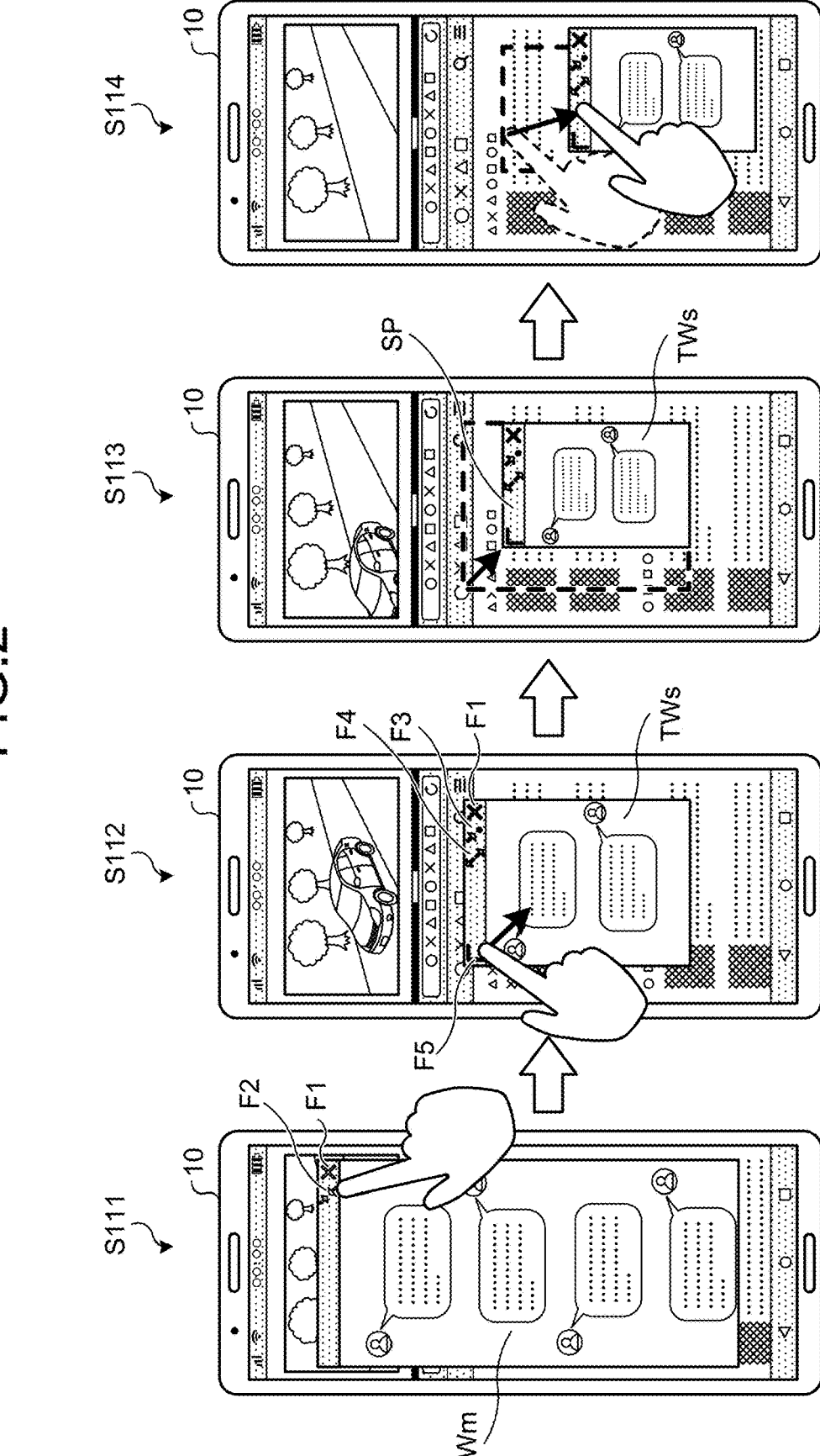
FIG. 2 is a diagram for describing an outline of a TWs mode.

FIG. 2 is a diagram for describing an outline of a TWs mode.

A state S111 in FIG. 2 illustrates a state in which the temporary window TWm (first window) is displayed in a superimposed manner on the main windows MW1 and MW2. The state S201 is the same as the state S103 in FIG. 1. When the user presses a function icon F2, the terminal device 10 closes the temporary window TWm and displays the temporary window TWs (second window) in a superimposed manner on the main windows MW1 and MW2. Here, the function icon F2 is an icon for changing the display mode of the temporary window from the TWm mode (first display mode) to the TWs mode (second display mode).

A state S112 in FIG. 2 illustrates a state in which the temporary window TWs is displayed in a superimposed manner on the main windows MW1 and MW2. The temporary window TWs is an application window intended for the user to adjust the balance of display with the application screen behind. Therefore, the user can freely change the position and the size of the temporary window TWs.

In the temporary window TWs, one of the end regions is a bar region (hereinafter, as in the case of the temporary window TWm, it is referred to as a navigation bar). In the example of the state S112, the upper end region of the temporary window TWs is a navigation bar. One or a plurality of function icons is disposed on the navigation bar. Since the position and the size of the temporary window TWs are variable, it is assumed that many function icons are required. Therefore, in the example of the state S112, function icons more than those of the temporary window TWm having a fixed position and a fixed size are disposed. Specifically, a function icon F1, a function icon F3, a function icon F4, and a function icon F5 are disposed on the temporary window TWs navigation bar.

A state S113 in FIG. 2 illustrates a state in which the size of the temporary window TWs has been changed. When the user slides (swipes) the finger while touching the function icon F5, the terminal device 10 changes the size of the temporary window TWs in accordance with the operation by the user. Here, the function icon F5 is an icon (resize button) for changing the size of the temporary window TWs. In the example of the state S113, the user reduces the size of the temporary window TWs so that the user can easily view the application screen behind.

A state S114 in FIG. 2 indicates a state in which the position of the temporary window TWs has been changed. The navigation bar of the temporary window TWs includes a non-display region SP where no function icon is displayed. When the user slides (swipes) the finger while touching the non-display region SP, the terminal device 10 moves the temporary window TWs in accordance with the operation by the user. In the example of the state S114, the user moves the temporary window TWs to the lower right so that the user can easily see the application screen behind.

With this operation, the user can freely change the position and the size of the temporary window TWs to balance the display with the original application screen. As a result, it is possible to perform the operation on the application behind while the display of the temporary window TWs is maintained.

Although the outline of the present embodiment is described above, the terminal device 10 according to the present embodiment will be described in detail below.

2. CONFIGURATION OF TERMINAL DEVICE

First, a configuration of the terminal device 10 will be described.

Figure 3:
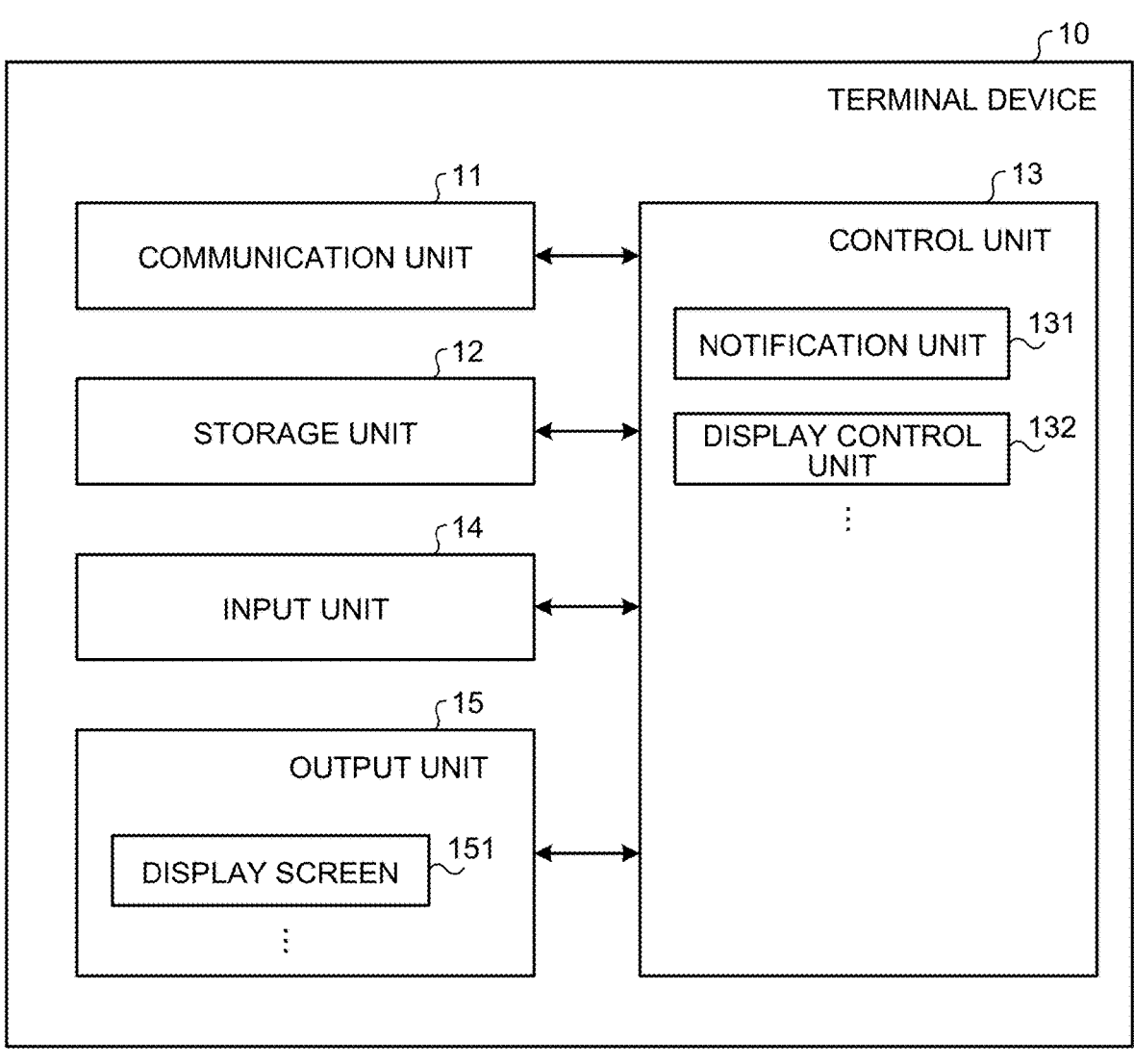
FIG. 3 is a diagram illustrating a configuration example of a terminal device according to an embodiment of the present disclosure.

FIG. 3 is a diagram illustrating a configuration example of the terminal device 10 according to the embodiment of the present disclosure. The terminal device 10 is an information processing device (computer) possessed by the user. The terminal device 10 is connected to another communication device (for example, the server device) via a network.

Here, the network is a communication network such as a local area network (LAN), a wide area network (WAN), a cellular network, a fixed telephone network, a regional Internet protocol (IP) network, or the Internet. The network may include a wired network or a wireless network. In addition, the network may include a core network. The core network is an evolved packet core (EPC) or a 5G core network (5GC). In addition, the network may include a data network other than the core network. The data network may be a service network of a communication company, for example, an IP multimedia subsystem (IMS) network. Furthermore, the data network may be a private network such as an intra-company network.

The terminal device 10 is typically a smart device (smartphone or tablet), but is not limited to the smart device. As the terminal device 10, any form of information processing device (computer) can be employed. For example, the terminal device 10 may be a mobile terminal such as a mobile telephone, a smart device, a personal digital assistant (PDA), or a notebook PC. Furthermore, the terminal device 10 may be a wearable device such as a smart watch. In addition, the terminal device 10 may be a portable Internet of Things (IOT) device.

Note that the terminal device 10 may be an xR device such as an augmented reality (AR) device, a virtual reality (VR) device, or a mixed reality (MR) device. At this time, the xR device may be a glasses-type device such as AR glasses or MR glasses, or may be a head-mounted device such as a VR head-mounted display. In a case where the terminal device 10 is an xR device, the terminal device 10 may be a standalone device including only a user wearing portion (for example, the glasses unit). Furthermore, the terminal device 10 may be a terminal interlocking device including a user wearing portion (for example, the glasses unit) and a terminal portion (for example, a smart device) interlocked with the user wearing portion.

As illustrated in FIG. 3, the terminal device 10 includes a communication unit 11, a storage unit 12, a control unit 13, an input unit 14, and an output unit 15. The configuration illustrated in FIG. 3 is a functional configuration, and the hardware configuration may be different from this. Further, the function of the terminal device 10 may be distributed and implemented in a plurality of physically separated configurations.

The communication unit 11 is a communication interface for communicating with other devices. For example, the communication unit 11 is a local area network (LAN) interface such as a network interface card (NIC). The communication unit 11 may be a wired interface or a wireless interface.

In a case where the communication unit 11 includes a wireless interface, the communication unit 11 may be configured to be connected to a network or another communication device using a radio access technology (RAT) such as long term evolution (LTE), new radio (NR), Wi-Fi, or Bluetooth (registered trademark). At this time, the communication device may be configured to be able to use different radio access technologies. For example, the communication device may be configured to be able to use NR and Wi-Fi. Furthermore, the communication device may be configured to be able to use different cellular communication technologies (for example, LTE and NR). The LTE and the NR each are a type of cellular communication technology, and enable mobile communication of a communication device by disposing a plurality of areas covered by base stations in a cell shape. In addition, the terminal device 10 may be connectable to a network or another communication device using a radio access technology other than LTE, NR, Wi-Fi, or Bluetooth.

The storage unit 12 is a data readable/writable storage device such as a dynamic random access memory (DRAM), a static random access memory (SRAM), a flash memory, and a hard disk. The storage unit 12 functions as a storage means for the terminal device 10.

The control unit 13 is a controller that controls each unit of the terminal device 10. The control unit 13 is realized by, for example, a processor such as a central processing unit (CPU), a micro processing unit (MPU), or a graphics processing unit (GPU). For example, the control unit 13 is realized by the processor executing various programs stored in the storage device inside the terminal device 10 with a random access memory (RAM) or the like as a work area. The control unit 13 may be realized by an integrated circuit such as an application specific integrated circuit (ASIC) or a field programmable gate array (FPGA). The CPU, the MPU, the GPU, the ASIC, and the FPGA can all be considered controllers.

The control unit 13 includes a notification unit 131 and a display control unit 132. Each block (notification unit 131 to display control unit 132) constituting control unit 13 is a functional block indicating a function of the control unit 13. These functional blocks may be software blocks or hardware blocks. For example, each of the above functional blocks may be one software module realized by software (including a microprogram), or may be one circuit block on a semiconductor chip (die). Of course, each functional block may be one processor or one integrated circuit. The control unit 13 may be configured in a functional unit different from the above-mentioned functional block. The method of configuring the functional block is any method.

The control unit 13 may be configured in a functional unit different from the above-mentioned functional block. In addition, some or all of the operations of the blocks (notification unit 131 to display control unit 132) constituting the control unit 13 may be performed by another device. For example, some or all of the operations of the blocks constituting the control unit 13 may be performed by a server device on a cloud. The operation of each block constituting the control unit 13 will be described later.

The input unit 14 is an input device that receives various inputs from the outside. For example, the input unit 14 is an operation device for the user to perform various operations, such as a keyboard, a mouse, and operation keys. Note that, in a case where a touch panel is used for the terminal device 10, the touch panel is also included in the input unit 14. In this case, the user performs various operations by touching the screen with a finger or a stylus.

Figure 4:
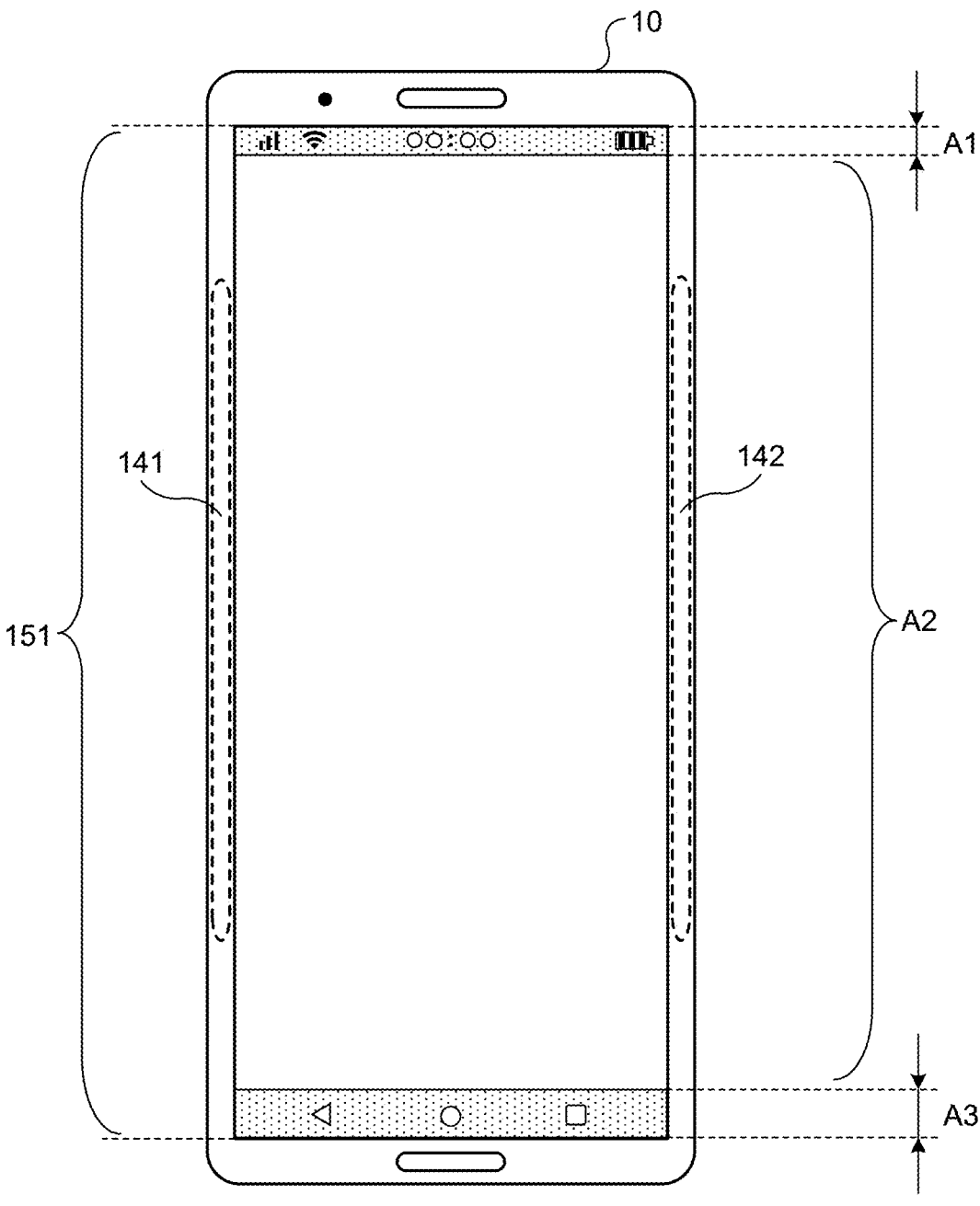
FIG. 4 is a view illustrating an example of an appearance of a terminal device.

Note that the terminal device 10 may include a touch sensor for operation separately from the touch panel. FIG. 4 is a diagram illustrating an example of an external appearance of the terminal device 10. For example, the terminal device 10 may be provided with sensor regions 141 and 142 capable of detecting contact of a user's finger along the longitudinal direction the outside the display screen. Various operations of the terminal device 10 can be performed by the user sliding the thumb in the region, for example.

Returning to FIG. 3, the output unit 15 is a device that performs various outputs such as sound, light, vibration, and an image to the outside. The output unit 15 performs various outputs to the user under the control of the control unit 13. Note that the output unit 15 includes a display device that displays various types of information. The display device is, for example, a liquid crystal display or an organic electro luminescence (EL) display. In the following description, a display device included in the terminal device 10 or a screen formed by the display device may be referred to as a display screen 151. Note that the display screen 151 may be a touch panel type display device. In this case, the display screen 151 may be regarded as a configuration integrated with the input unit 14.

Figure 5:
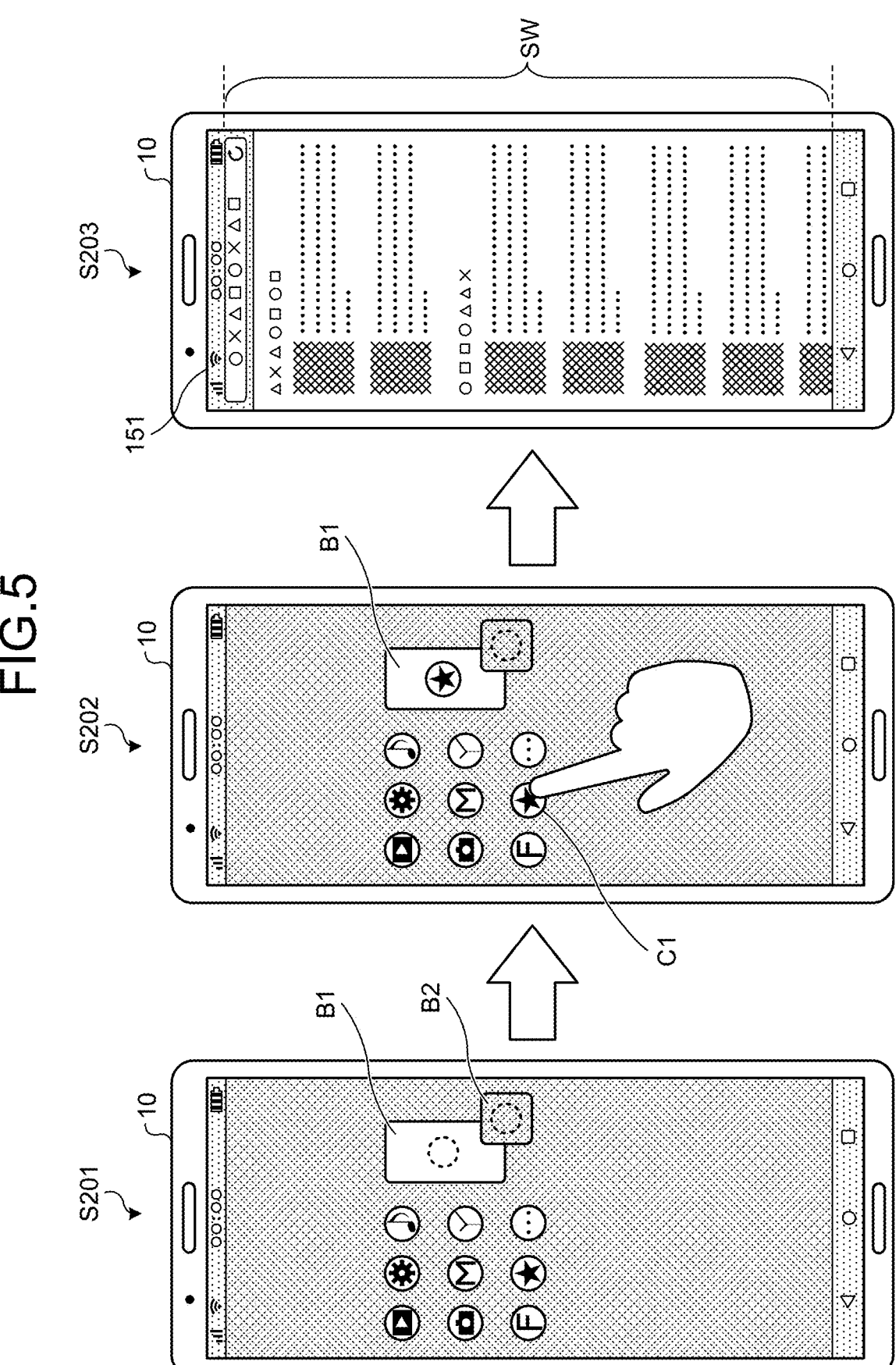
FIG. 5 is a diagram for explaining a method of activating a single window mode.

The display screen 151 may be, for example, a longitudinal screen as illustrated in FIG. 5. An upper region A1 of the display screen 151 is a region for displaying general information (for example, time, radio wave state, battery state, and the like). A lower region A3 of the display screen 151 is a region for displaying various keys (for example, a back key, a home key, and a menu/multitasking key). A central region A2 sandwiched between these regions is a display region of the application screen. Note that the display region of the application screen is not limited to the central region A2. For example, the terminal device 10 may set a region obtained by combining the upper region A1 and/or the lower region A3 with the central region A2 as the display region of the application screen.

Note that, in a case where the terminal device 10 is an xR device (for example, AR/MR glasses), the output unit 15 may be a transmission type device that projects an image on glasses, or may be a retina projection type device that directly projects an image on the retina of the user. Note that there may be a case where the terminal device 10 does not have a screen (for example, a screen projected on a display, a panel, or the like) as an object, for example, by having a means for directly projecting an image on the retina of the user. Even in this case, when the user can recognize the screen, the screen can be regarded as the display screen 151 of the present embodiment.

3. METHOD OF DISPLAYING APPLICATION SCREEN

Although the configuration of the terminal device 10 is described above, before describing the operation of the terminal device 10, a method of displaying an application screen will be described.

As a method of displaying the application screen, there are at least a single-window method and a multi-window method. Hereinafter, each of these methods will be described. Note that the method of displaying the application screen is not limited to the two methods of the single-window method and the multi-window method. In the following description, among the display methods of the application screen, a method using a single window may be referred to as a single window mode, and a method using a multi-window may be referred to as a multi-window mode.
<3-1. Single Window>

First, the single window mode will be described.

In the single window mode, the terminal device 10 opens one application window (single window) on the display screen 151. The terminal device 10 displays an application screen in the window. In the following description, an application window opened in the single window mode may be referred to as a main window SW.

FIG. 5 is a diagram for describing a method of activating the single window mode. The following processing is performed, for example, by the display control unit 132 of the terminal device 10.

When the user performs a predetermined operation, the terminal device 10 displays a first interface on the display screen 151 (state S201). The first interface is a user interface for opening an application in a single window mode. The first interface is opened, for example, by the user sliding a finger upward or downward in the sensor region 141 or the sensor region 142. Of course, the method of opening the first interface is not limited thereto.

A box B1 representing the main window SW and a box B2 representing the temporary window TWs are displayed on the first interface. Focus (highlight) of the box B1 and the box B2 is switched by a tap of the user. In the example of the state S201, the box B1 is in a focused state.

In addition, a plurality of icons is displayed on the first interface. These icons are associated with applications installed in the terminal device 10. When the user taps one of the plurality of icons, the terminal device 10 displays the icon selected by the user in the box that is currently focused (state S202). In the example of the state S202, the terminal device 10 displays an icon C1 in the box B1.

After displaying the icon C1 in the box B1, the terminal device 10 displays the main window SW on the display screen 151 (state S203). At this time, the terminal device 10 displays the application associated with the icon C1 selected by the user in the main window SW. In the example of the state S203, the terminal device 10 displays a browser in the main window SW.

Note that the single window display method described here is merely an example, and there may be other methods. The first interface is also transformable to a user interface for opening an application in a multi-window mode.
<3-2. Multi-Window>

Next, the multi-window mode will be described.

In the multi-window mode, the terminal device 10 opens a plurality of application windows (multi-window) on the display screen 151. The terminal device 10 displays an application screen in each of the plurality of windows. In the multi-window mode of the present embodiment, for example, the terminal device 10 divides the central region A2 of the display screen 151 into two parts of upper and lower parts. In the following description, an application window opened to the upper divided region may be referred to as the main window MW1, and an application window opened to the lower divided region may be referred to as the main window MW2. A method of dividing the display screen 151 in the multi-window mode is not limited to the foregoing.

Figure 6:
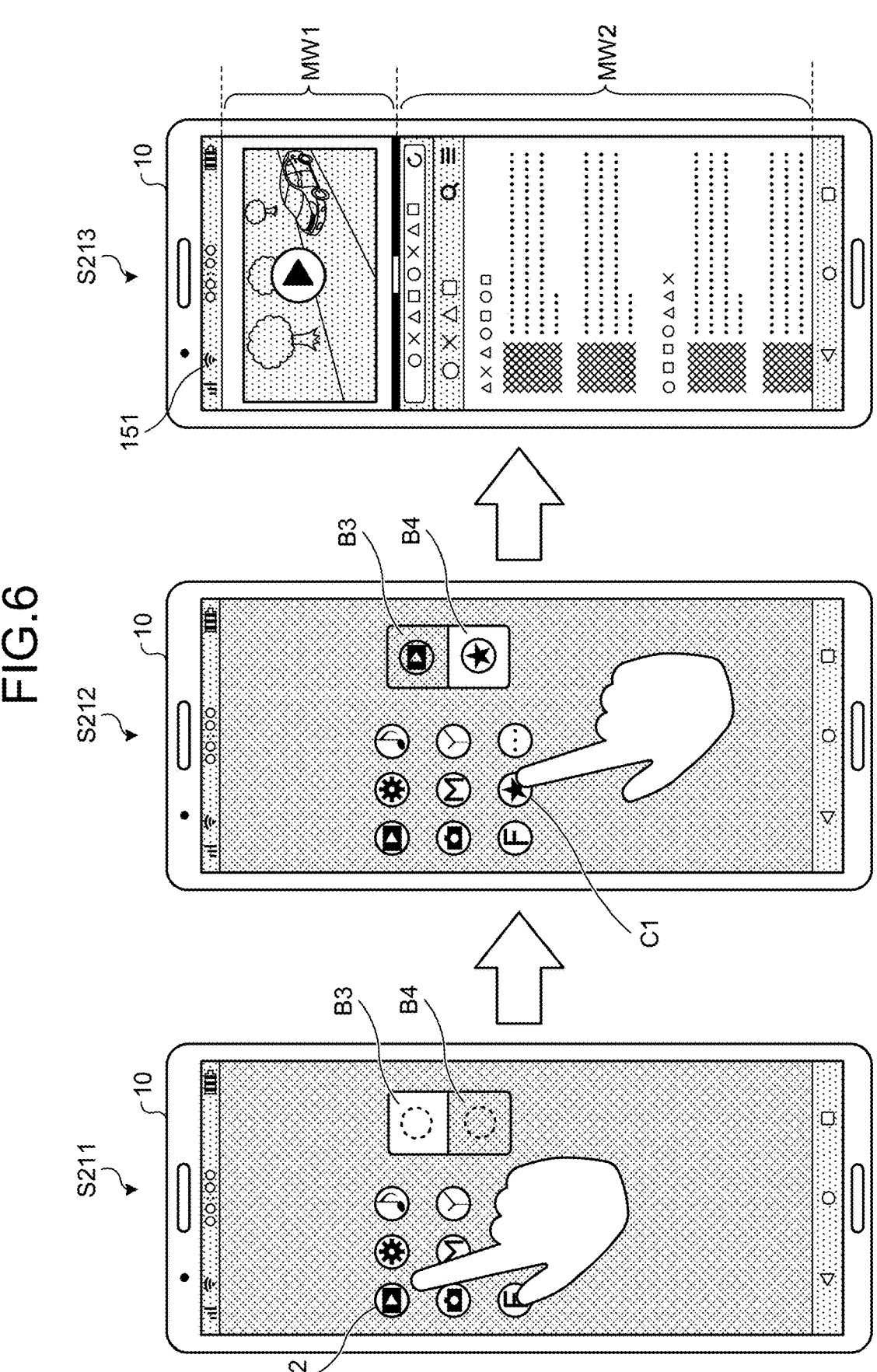
FIG. 6 is a diagram for explaining a method of activating a multi-window mode.

FIG. 6 is a diagram for describing a method of activating the multi-window mode. The following processing is performed, for example, by the display control unit 132 of the terminal device 10.

When the user performs a predetermined operation, the terminal device 10 displays a second interface on the display screen 151 (state S211). The second interface is a user interface for opening applications in a multi-window mode. The second interface is opened, for example, by the user sliding the finger upward or downward in the sensor region 141 or the sensor region 142. Of course, the method of opening the second interface is not limited thereto.

A box B3 representing the main window MW1 and a box B4 representing the main window MW2 are displayed on the second interface. The focus (highlight) of the box B3 and the box B4 is switched by the tap of the user. In the example of the state S201, the box B1 is in a focused state. Note that, in the example of FIG. 6, the box B2 representing the temporary window TWs is not displayed, but the box B2 may be displayed as in the example of FIG. 5. That is, the terminal device 10 may be configured to be able to open the second interface and activate the temporary window TWs while keeping the state of the main window in the multi-window state.

In addition, a plurality of icons is displayed on the second interface. These icons are associated with applications installed in the terminal device 10. When the user taps one of the plurality of icons, the terminal device 10 displays the icon selected by the user in the box that is currently focused, and shifts the focus (highlight) to the other box in which the icon is not displayed yet. In the example of a state S212, the terminal device 10 displays an icon C2 in the box B3 and moves the focus to the box B4.

Thereafter, when the user taps one of the plurality of icons, the terminal device 10 displays the icon selected by the user in the box that is currently focused (state S212). In the example of the state S212, the terminal device 10 displays the icon C1 in the box B1.

After displaying the icon C1 in the box B4, the terminal device 10 displays the main window MW1 and the main window MW2 on the display screen 151 (state S213). At this time, the terminal device 10 displays the application associated with the icon C2 displayed in the box B3 by the user in the main window MW1. In the example of the state S213, the terminal device 10 displays a video application in the main window MW1. In addition, the terminal device 10 displays the application associated with the icon C1 displayed in the box B4 by the user in the main window MW2. In the example of the state S213, the terminal device 10 displays a browser in the main window MW2.

Note that the multi-window display method described here is merely an example, and there may be other methods.

4. OPERATION OF TERMINAL DEVICE

Although the display method of the application screen is described above, the operation of the terminal device 10 of the present embodiment will be described on the premise of the above.

<4-1. Temporary Window>

Figure 7:
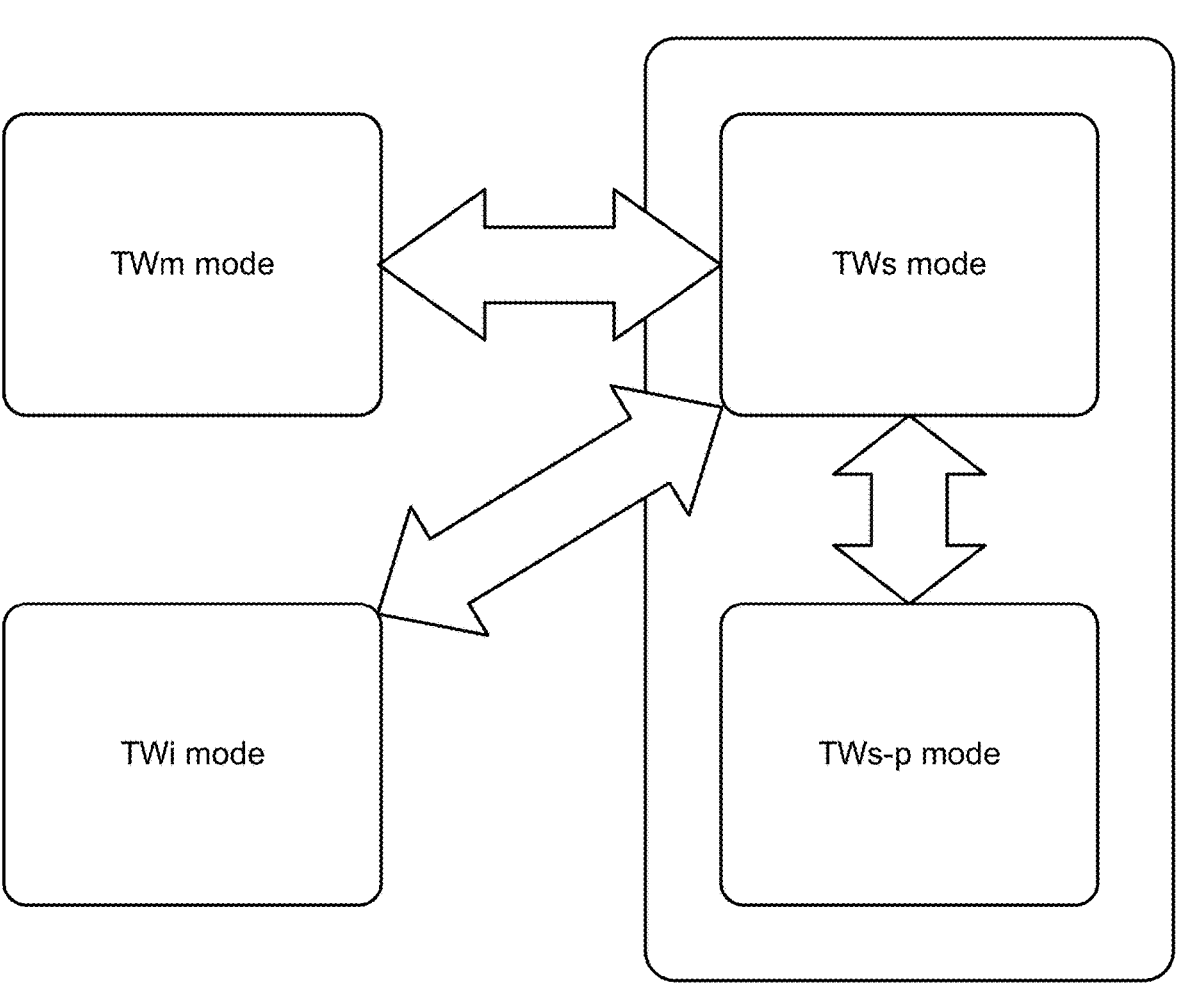
FIG. 7 is a mode transition diagram of a display mode of a temporary window.

As described above, the terminal device 10 can display the temporary window in a superimposed manner on the current application screen. The terminal device 10 has a plurality of display modes as display modes of the temporary window. FIG. 7 is a mode transition diagram of the display mode of the temporary window. The terminal device 10 of the present embodiment has at least four display modes illustrated in the following (1) to (4) as display modes of the temporary window.

(1) TWm mode (first display mode)
(2) TWs mode (second display mode)
(3) TWs-p mode (third display mode)
(4) TWi mode (fourth display mode)

These four display modes will be described below.

<4-1-1. TWm Mode (First Display Mode)>

The TWm mode is a mode intended to allow the user to temporarily perform an operation while maintaining the display state of the main window when an interruption occurs during the operation with the main window. In the TWm mode, the terminal device 10 displays the temporary window TWm (first window) having a fixed position and a fixed size in a superimposed manner on the current application screen.

Figure 8:
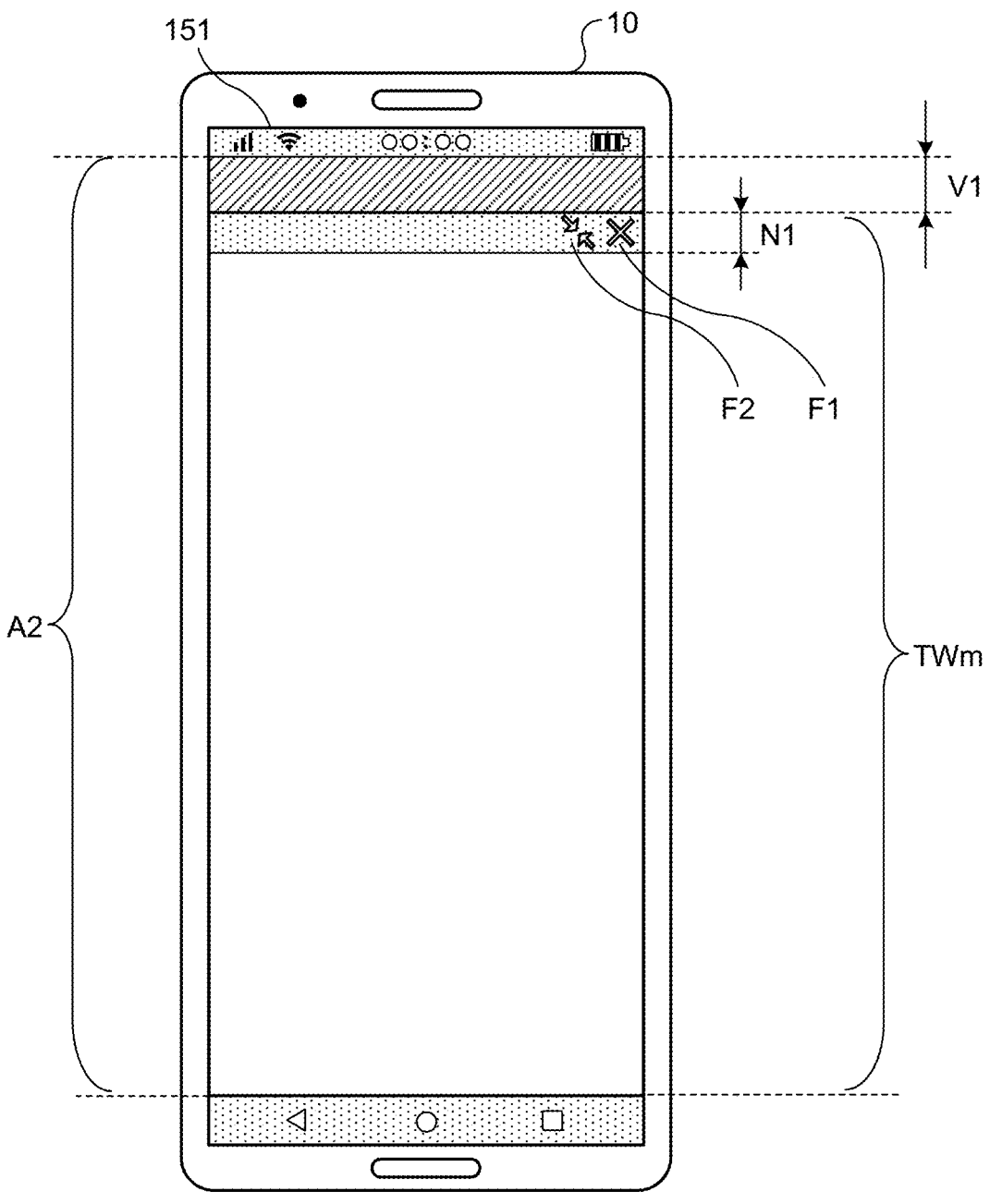
FIG. 8 is a diagram illustrating a state in which a temporary window TWm is displayed.

FIG. 8 is a diagram illustrating a state in which temporary window TWm is displayed. In the example of FIG. 8, the temporary window TWm is displayed in the central region A2 which is a display region of the application screen. The terminal device 10 displays the temporary window TWm in a superimposed manner on the application screen so that the user can visually recognize at least part of the application screen behind.

Unlike the example of FIG. 1, the temporary window TWm illustrated in FIG. 8 has a width that matches the width of the central region A2. In addition, the lower side of the temporary window TWm illustrated in FIG. 8 matches the lower side of the central region A2. However, the temporary window TWm illustrated in FIG. 8 is located at a position where the upper side is retracted downward from the upper side of the central region A2. Therefore, a region sandwiched between the upper side of the central region A2 and the upper side of the temporary window TWm is a visually-recognizable region V1 in which the user can visually recognize the application screen behind.

The terminal device 10 has the bar region (navigation bar) in any one of the end regions (upper end region, lower end region, left end region, and right end region) of the temporary window TWm. In the example of FIG. 8, the terminal device 10 displays a navigation bar N1 in the upper end region of the temporary window TWm. The terminal device 10 has one or a plurality of function icons related to the window operation on the navigation bar N1. Note that the name of the function icon may be another name such as a function button.

In the example of FIG. 8, the function icon F1 and the function icon F2 are disposed on the navigation bar N1. Here, the function icon F1 is an icon (close button) for closing the temporary window. In addition, the function icon F2 is an icon for changing the display mode of the temporary window from the TWm mode (first display mode) to the TWs mode (second display mode).

Note that at least one of the function icons displayed in the temporary window TWm is different from a plurality of function icons displayed in the temporary window TWs. In addition, since the position and the size of the temporary window TWm are fixed, it is assumed that many function icons are not necessary. Therefore, the number of function icons displayed in the temporary window TWm is smaller than the number of function icons displayed in the temporary window TWs. In the example of FIG. 8, only two function icons of the function icon F1 and the function icon F2 are disposed in the navigation bar N1.

In a case where a user operation (for example, a tap) is performed on the function icon F2, or in a case where a user operation (for example, a tap) is performed on the visually-recognizable region V1, the terminal device 10 causes the display mode of the temporary window to transition from the TWm mode (first display mode) to the TWs mode (second display mode).

<4-1-2. TWs Mode (Second Display Mode)>

The TWs mode is a mode in which the user can perform the operation on the original application while leaving the screen of the new application displayed in a superimposed manner on the original application screen. In the TWs mode, the terminal device 10 displays the temporary window TWs (second window) having a variable position and a variable size in a superimposed manner on the current application screen. Unlike the TWs-p mode to be described later, in the TWs mode, the temporary window is focused.

Figure 9:
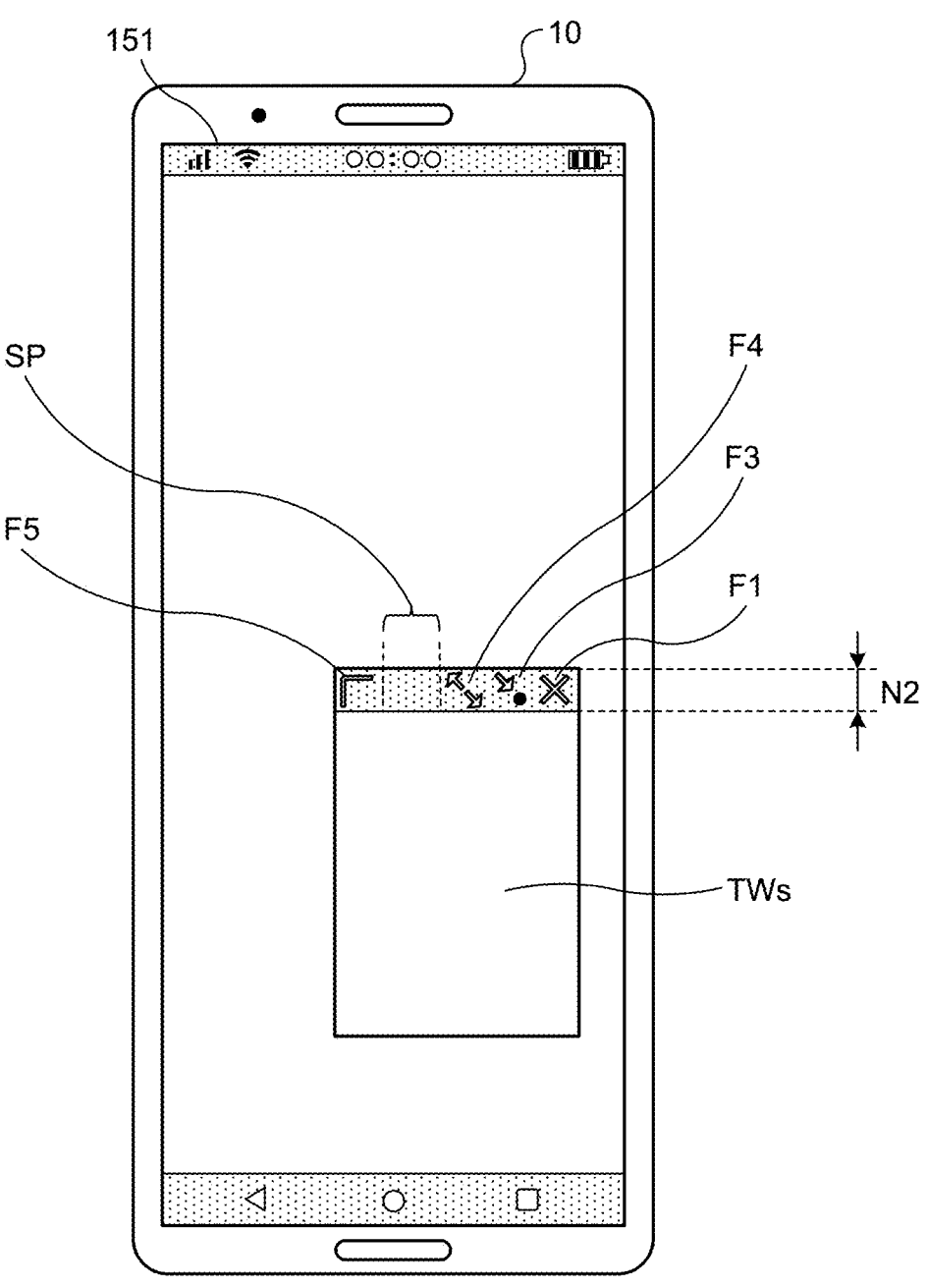
FIG. 9 is a diagram illustrating a state in which a temporary window TWs is displayed.

FIG. 9 is a diagram illustrating a state in which the temporary window TWs is displayed. In the example of FIG. 9, the temporary window TWs is displayed in the central region A2 which is a display region of the application screen. Note that, in the example of FIG. 9, illustration of the main window is omitted in order to facilitate visual recognition of the temporary window TWs. The user freely changes the position and the size of the temporary window TWs to balance the display with the application screen.

When at least the temporary window TWm is focused, the terminal device 10 has the bar region (navigation bar) in any one of end regions (upper end region, lower end region, left end region, and right end region) of the temporary window TWs. In the example of FIG. 9, the terminal device 10 displays a navigation bar N2 in the upper end region of the temporary window TWs. The terminal device 10 has one or a plurality of function icons related to window operation on the navigation bar N2. Note that the name of the function icon may be another name such as a function button.

In the example of FIG. 9, the function icon F1, the function icon F3, the function icon F4, and the function icon F5 are disposed on the navigation bar N2. Here, the function icon F1 is an icon (close button) for closing the temporary window. In addition, the function icon F3 is an icon for changing the display mode of the temporary window from the TWs mode (second display mode) to the TWi mode (fourth display mode). The TWi mode will be described later. In addition, the function icon F4 is an icon for changing the display mode of the temporary window from the TWs mode (second display mode) to the TWm mode (first display mode). In addition, the function icon F5 is an icon (resize button) for changing the size of the temporary window TWs.

Note that at least one of the function icons displayed in the temporary window TWs is different from a plurality of function icons displayed in the temporary window TWm. In addition, since the temporary window TWs has a variable position and a variable size, it is assumed that function icons more than those of the temporary window TWm are required. Therefore, the number of function icons displayed in the temporary window TWs is larger than the number of function icons displayed in the temporary window TWm. In the example of FIG. 9, five function icons including the function icon F1, the function icon F3, the function icon F4, and the function icon F5 are disposed on the navigation bar N2.

The navigation bar N2 of the temporary window TWs includes a non-display region SP where no function icon is displayed. The terminal device 10 moves the position of the temporary window TWs based on a movement operation of the temporary window TWs by the user using the non-display region SP. For example, when the user slides (swipes) the finger while touching the non-display region SP, the terminal device 10 moves the temporary window TWs in accordance with the movement operation by the user. Note that the name of the non-display region may be another name such as a blank region.

<4-1-3. TWs-p Mode (Third Display Mode)>

The TWs-p mode is a state in which the temporary window TWs is not focused in the TWs mode (second display mode). In the TWs-p mode, the terminal device 10 displays a temporary window TWs-p (third window), which is a temporary window TWs that is not focused, in a superimposed manner on the current application screen. Note that the TWs-p mode (third display mode) can be regarded as a type of the TWs mode (second display mode). Furthermore, the temporary window TWs-p (third window) can be regarded as a type of the temporary window TWs (second window).

Figure 10:
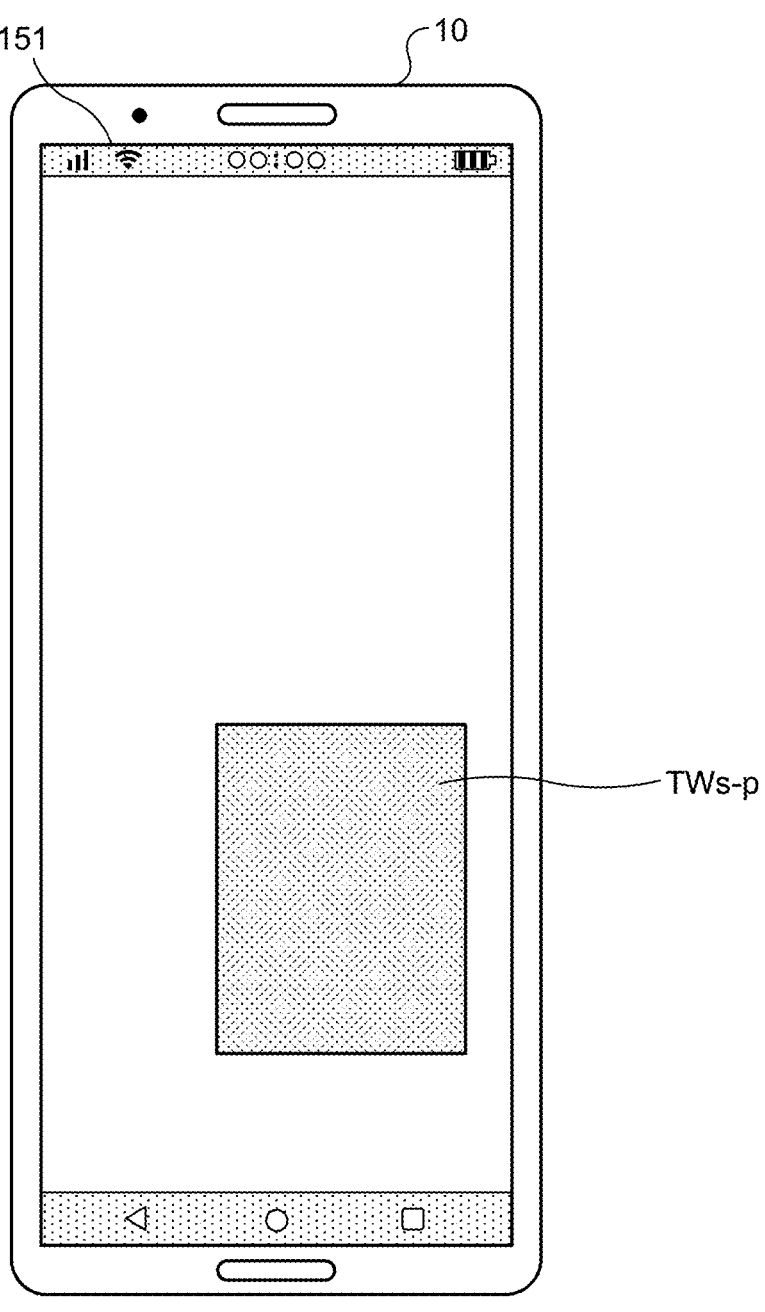
FIG. 10 is a diagram illustrating a state in which a temporary window TWs-p is displayed.

FIG. 10 is a diagram illustrating a state in which the temporary window TWs-p is displayed. Note that, in the example of FIG. 10, the main window is not illustrated in order to facilitate visual recognition of the temporary window TWs-p. When the display mode of the temporary window transitions from the TWs mode to the TWs-p mode, that is, when the focus for the temporary window TWs shifts from the temporary window TWs to another window, the terminal device 10 erases the navigation bar N2 from the temporary window TWs. This makes it easy to visually recognize the application screen behind.

<4-1-4. TWi Mode (Fourth Display Mode)>

Figure 11:
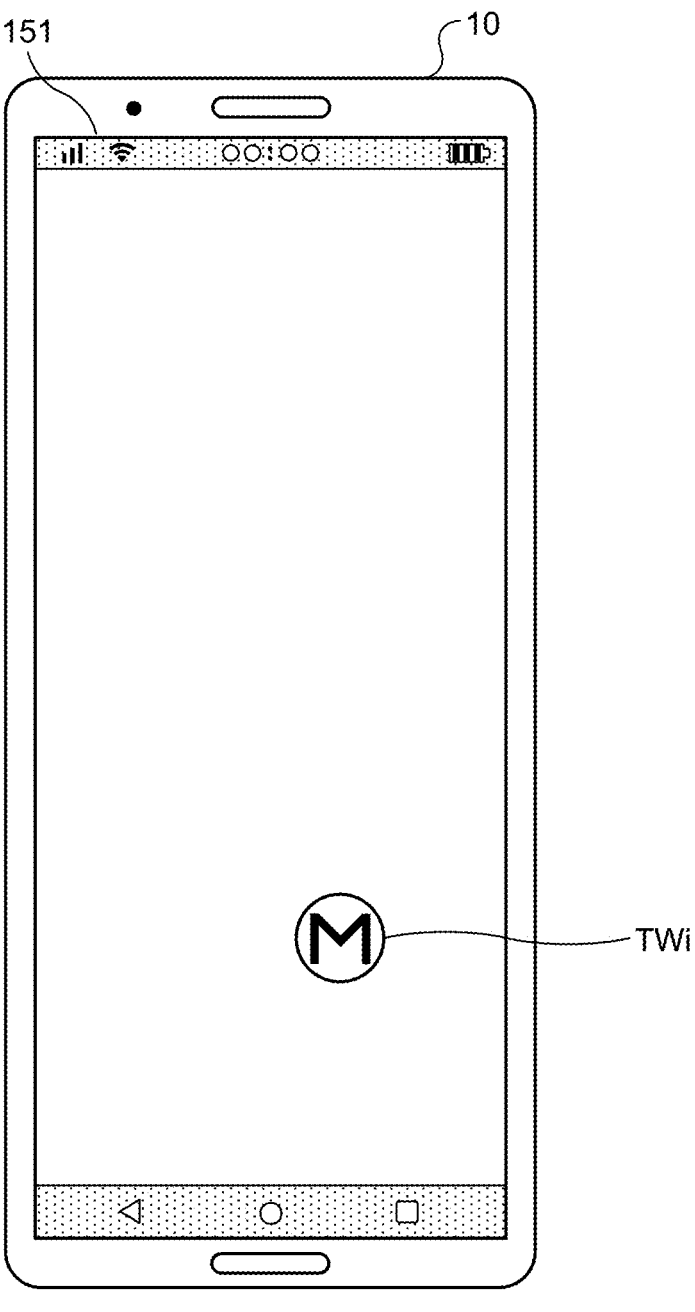
FIG. 11 is a diagram illustrating a state in which a temporary window TWs is made into an icon.

The TWi mode is a state in which the temporary window TWs is made into an icon in the TWs mode (second display mode). FIG. 11 is a diagram illustrating a state in which the temporary window TWs is made into an icon. In the following description, the iconized temporary window TWs is referred to as an icon TWi. In the example of FIG. 11, the main window is not illustrated in order to facilitate visual recognition of the icon TWi. When the user presses the function icon F3 in the TWs mode illustrated in FIG. 9, the terminal device 10 iconizes the temporary window TWs to display the iconized temporary window TWsn on the application screen. At this time, the image of the icon TWi displayed by the terminal device 10 may be an image of an icon associated with the application displayed in the temporary window TWs.

<4-2. Activation and Mode Transition>

Next, activation and mode transition of each display mode will be described. In the following description, for easy understanding, the main window is assumed to be a single window (main window SW), but the main window may be a multi-window (main windows MW1, MW2). In this case, the following description of the main window SW can be replaced with the main windows MW1 and MW2.

<4-2-1. TWm Mode (First Display Mode)>

First, activation and mode transition of the TWm mode will be described.

Figure 12:
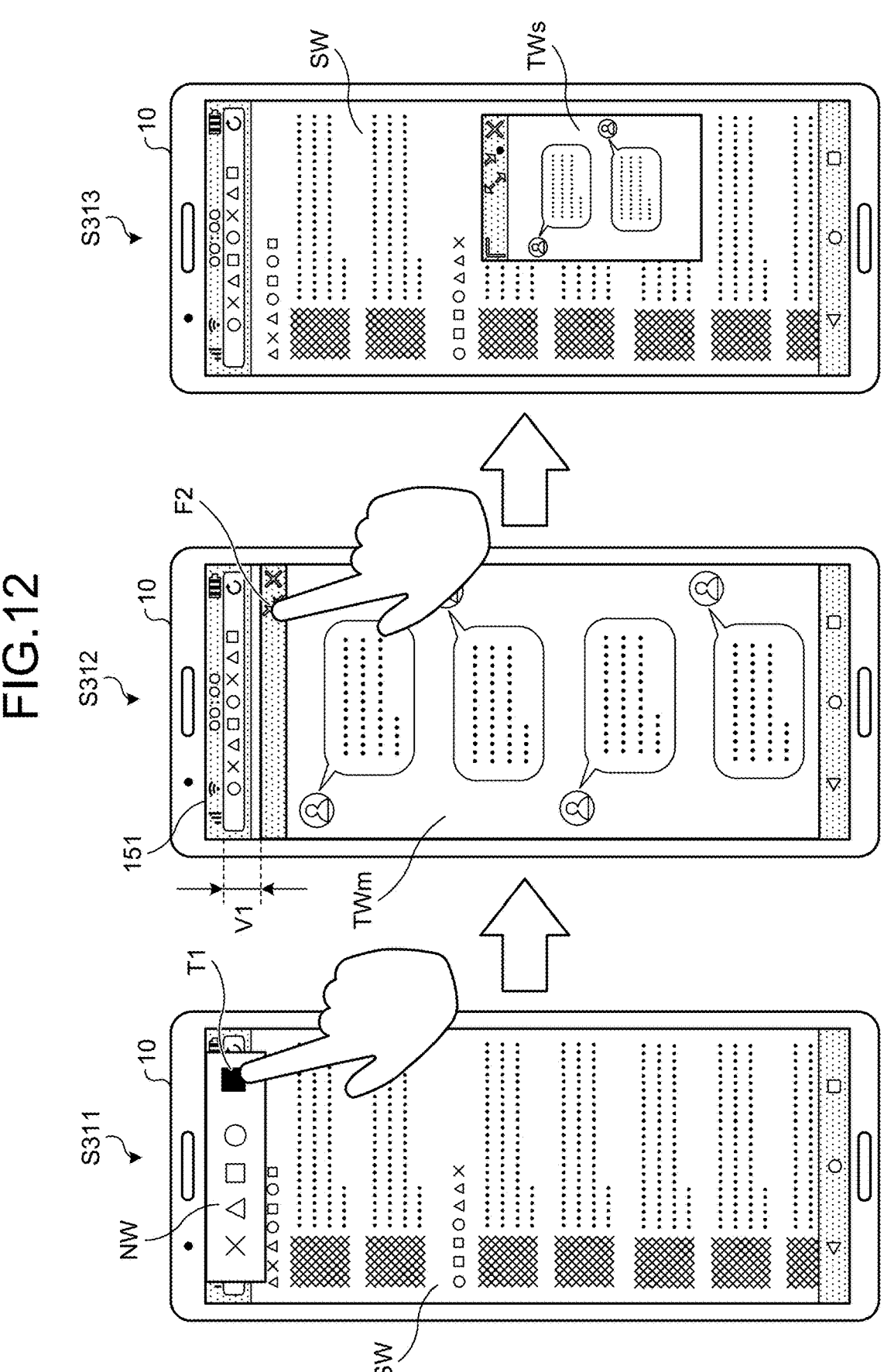
FIG. 12 is a diagram illustrating a state of activating a TWm mode.

FIG. 12 is a diagram illustrating a state in which the TWm mode is activated. A state 311 in FIG. 12 indicates a state in which the notification window NW for message arrival is displayed while the browser is displayed in the main window SW. This notification is executed, for example, by the notification unit 131 of the terminal device 10. The terminal device 10 displays the activation button T1 in the notification window NW. The activation button T1 is a button for opening an application related to notification with the temporary window TWm. In the present embodiment, as an example, it is assumed that the application related to the notification is a message application, but the application related to the notification is not limited to the message application.

In a case where the user performs an operation to display the notification, the terminal device 10 displays, in a superimposed manner on the application screen, the temporary window TWm in which the display related to the notification is performed while maintaining the application screen behind. For example, when the user taps the activation button T1, the terminal device 10 displays, in a superimposed manner on the main window SW, the temporary window TWm on which the message application is displayed (state S312).

The user can cause the display mode of the temporary window to transition from the TWm mode to the TWs mode. The terminal device 10 causes the display mode of the temporary window to transition from the TWm mode to the TWs mode based on the operation by the user. For example, when the user taps the function icon F1 of the temporary window TWm, the terminal device 10 closes the temporary window TWm and displays the temporary window TWs in a superimposed manner on the main window SW (state S313). Note that the display of the message application displayed in the temporary window TWm is maintained in the temporary window TWs.

Note that the method of causing the display mode of the temporary window to transition to the TWs mode is not limited to the above. For example, in a case where the user performs an operation on the visually-recognizable region V1 during the TWm mode, the terminal device 10 may cause the display mode of the temporary window to transition from the TWm mode to the TWs mode. For example, in a case where the user taps the visually-recognizable region V1 in a state where the temporary window TWm is displayed, the terminal device 10 closes the temporary window TWm and displays the temporary window TWs in a superimposed manner on the main window SW.

<4-2-2. TWs Mode (Second Display Mode)>

Next, activation and mode transition of the TWs mode will be described.

As described above, the TWs mode can be activated by mode transition from the TWm mode (first display mode). However, the TWs mode can also be activated using a user interface.

Figure 13:
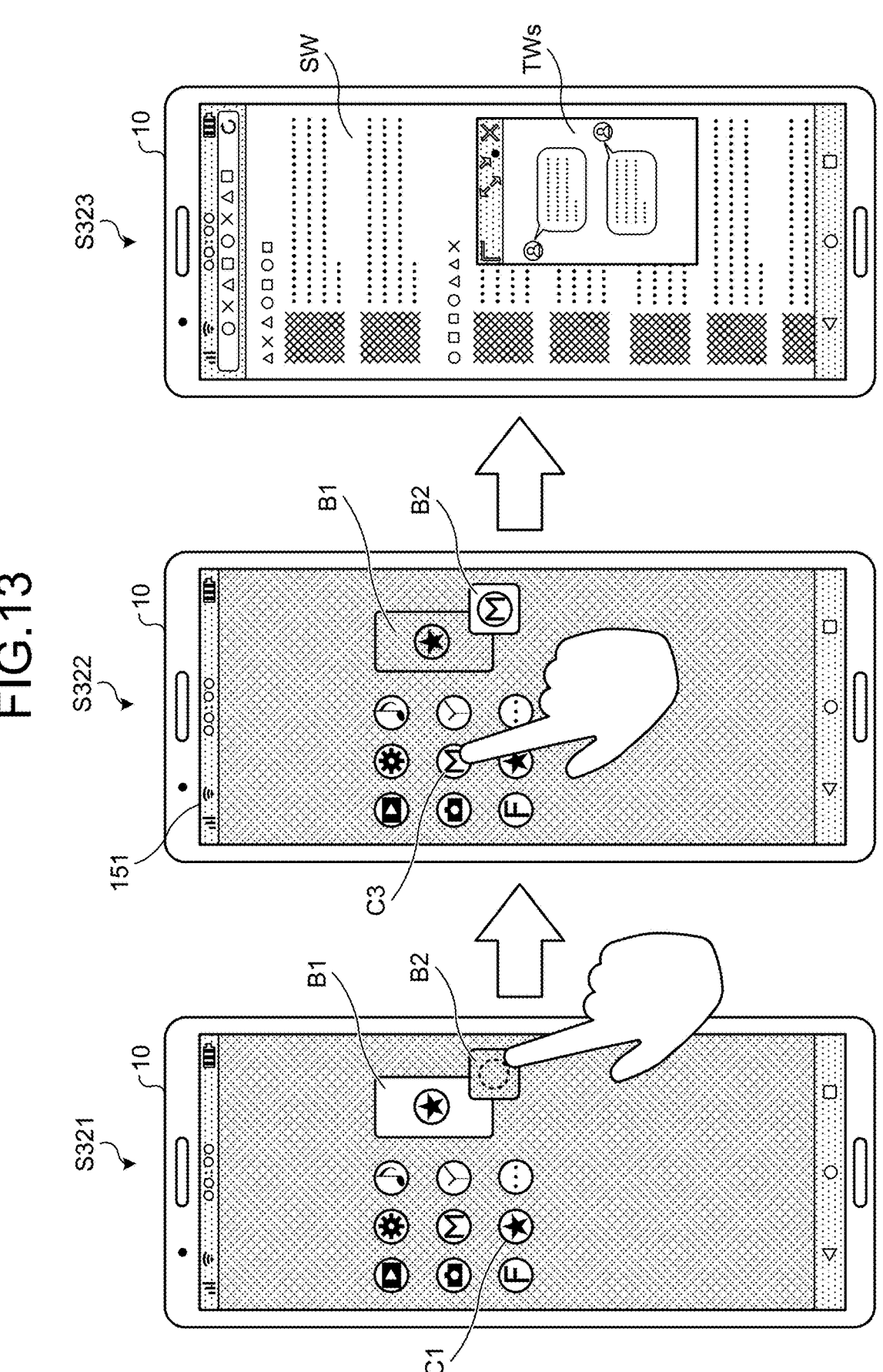
FIG. 13 is a diagram illustrating a state in which a TWs mode is activated using a user interface.

FIG. 13 is a diagram illustrating how to activate the TWs mode by using the user interface. When the user performs a predetermined operation for opening the first interface, the terminal device 10 displays the first interface on the display screen 151 (state S321). Here, the first interface is a user interface for opening an application in the TWs mode. On the first interface, a first box representing a display region of the application screen and a second box representing the TWs window are displayed. In the example of the state S321, the terminal device 10 displays the box B1 representing the main window SW as the first box, and displays the box B2 representing the temporary window TWs as the second box. The first box may be boxes (for example, box B3 and box B4 illustrated in FIG. 6) representing the main window M1 and the main window M2.

Focus (highlight) of the box B1 and the box B2 is switched by a tap of the user. In the example of the state S321, the box B1 is in a focused state. When the user taps the box B2, the focus shifts to the box B2 (state S321).

In addition, a plurality of icons is displayed on the first interface. These icons are associated with applications installed in the terminal device 10. When the user taps one of the plurality of icons, the terminal device 10 displays the icon selected by the user (an icon C3 in the example of the state S322) in the box B2. Here, it is assumed that a message application is associated with the icon C3.

After displaying the icon C3 in the box B1, the terminal device 10 displays the temporary window TWs in a superimposed manner on the main window Sw on the display screen 151 (state S323). At this time, the terminal device 10 displays the application associated with the icon C3 in the temporary window TWs. In the example of the state S203, the terminal device 10 displays a message application in the temporary window TWs.

The user can cause the display mode of the temporary window to transition from the TWs mode to the TWm mode. The terminal device 10 causes the display mode of the temporary window to transition from the TWs mode to the TWm mode based on the operation by the user. For example, when the user taps the function icon F4 of the temporary window TWs, the terminal device 10 closes the temporary window TWs and displays the temporary window TWm in a superimposed manner on the main window SW. Note that the display of the message application displayed in the temporary window TWm is maintained in the temporary window TWm.

<4-2-3. TWs-p Mode (Third Display Mode)>

Next, activation and mode transition of the TWs-p mode will be described.

As illustrated in the mode transition diagram of FIG. 7, the TWs-p mode can transition from the TWs mode. As described above, the TWs-p mode is a state in which the temporary window TWs is not focused.

Figure 14:
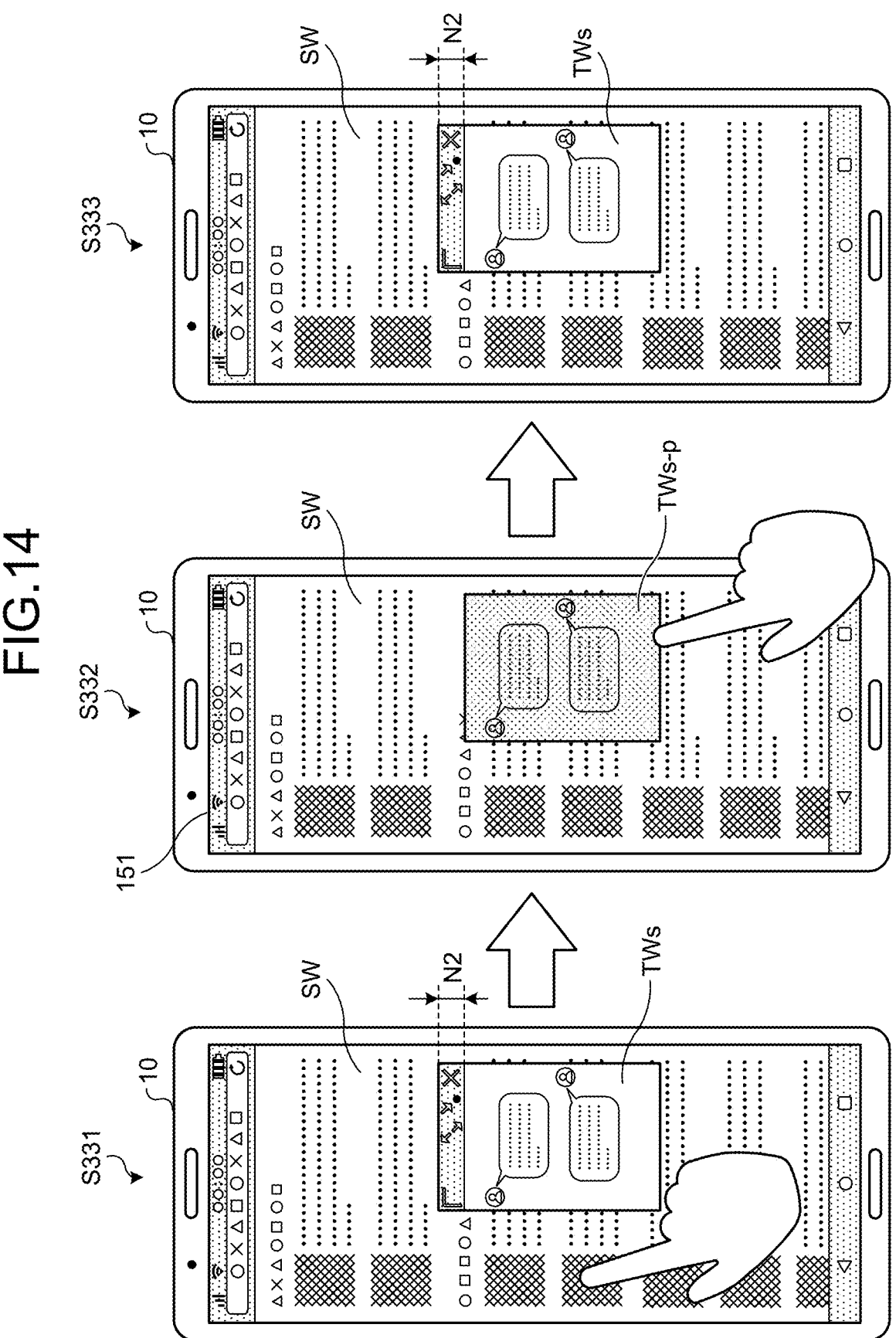
FIG. 14 is a diagram illustrating mode transition of a TWs-p mode.

FIG. 14 is a diagram illustrating mode transition of the TWs-p mode. In a state S331 of FIG. 14, the temporary window TWs is displayed on the main window SW. In the example of the state S331, the temporary window TWs is focused.

Here, when the user taps the display region of the main window SW outside the temporary window TWs, the terminal device 10 causes the display mode of the temporary window to transition from the TWs mode to the TWs-p mode (state S332). With the mode transition, the terminal device 10 displays the temporary window TWs-p in a superimposed manner on the main window SW instead of the temporary window TWs. The temporary window TWs-p is a temporary window TWs that is not focused. In the TWs-p mode, the terminal device 10 erases the navigation bar N2.

In order to return the display mode to the TWs mode, the user may tap the display region of the temporary window TWs-p. When the user taps the display region of the temporary window TWs-p, the terminal device 10 causes the display mode of the temporary window to transition from the TWs-p mode to the TWs mode (state S333). With the mode transition, the terminal device 10 displays the temporary window TWs in a superimposed manner on the main window SW instead of the temporary window TWs-p.

<4-2-4. TWi Mode (Fourth Display Mode)>

Next, activation and mode transition of the TWi mode will be described.

As illustrated in the mode transition diagram of FIG. 7, the TWi mode can transition from the TWs mode. As described above, the TWi mode is a state in which the temporary window TWs is made into an icon.

Figure 15:
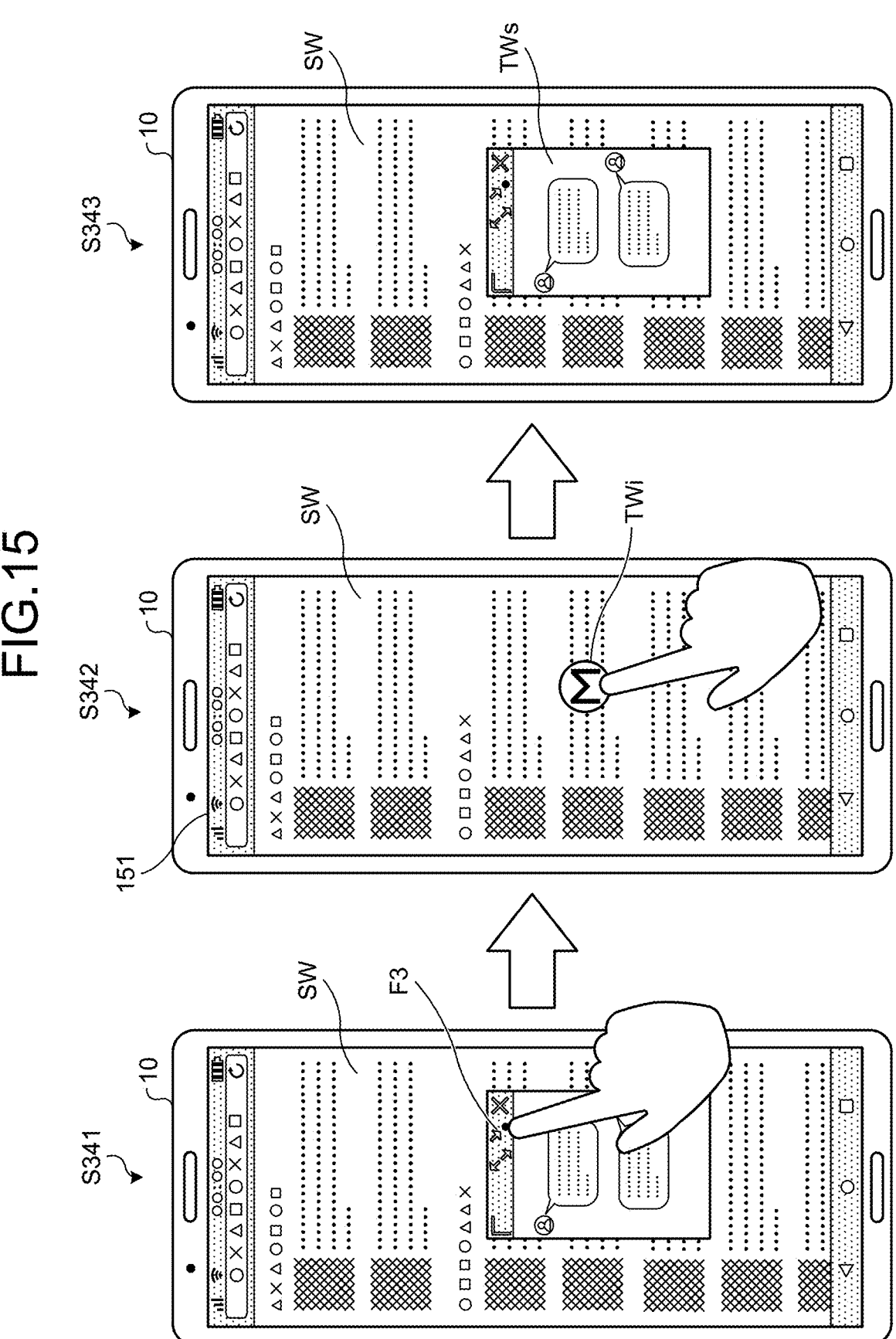
FIG. 15 is a diagram illustrating mode transition of a TWi mode.

FIG. 15 is a diagram illustrating mode transition of the TWi mode. In a state S341 of FIG. 15, the temporary window TWs is displayed on the main window SW. As described above, the function icon F3 is disposed in the temporary window TWs. As described above, the function icon F3 is an icon for changing the display mode of the temporary window from the TWs mode to the TWi mode.

Here, when the user taps the function icon F3, the terminal device 10 causes the display mode of the temporary window to transition from the TWs mode to the TWi mode (state S342). With the mode transition, the terminal device 10 closes the temporary window TWs and displays the icon TWi in a superimposed manner on the main window SW. The icon TWi is an iconized temporary window TWs. Here, the image of the icon TWi may be an image of an icon associated with the application displayed in the temporary window TWs. Furthermore, the position of the icon TWi may be freely changeable by the user by swiping or the like.

To return the display mode to the TWs mode, the user may tap the icon TWi. When the user taps the icon TWi, the terminal device 10 causes the display mode of the temporary window to transition from the TWi mode to the TWs mode (state S343). With the mode transition, the terminal device 10 erases the icon TWi from the display screen 151 and displays the temporary window TWs in a superimposed manner on the main window SW.

<4-3. Change in Display Aspect by Position of Window>

Although the activation and mode transition of each display mode have been described above, a change in the display aspect of the temporary window TWs depending on the position of the temporary window TWs on the display screen 151 will be described.

<4-3-1. Movement of Temporary Window TWs>

Figure 16:
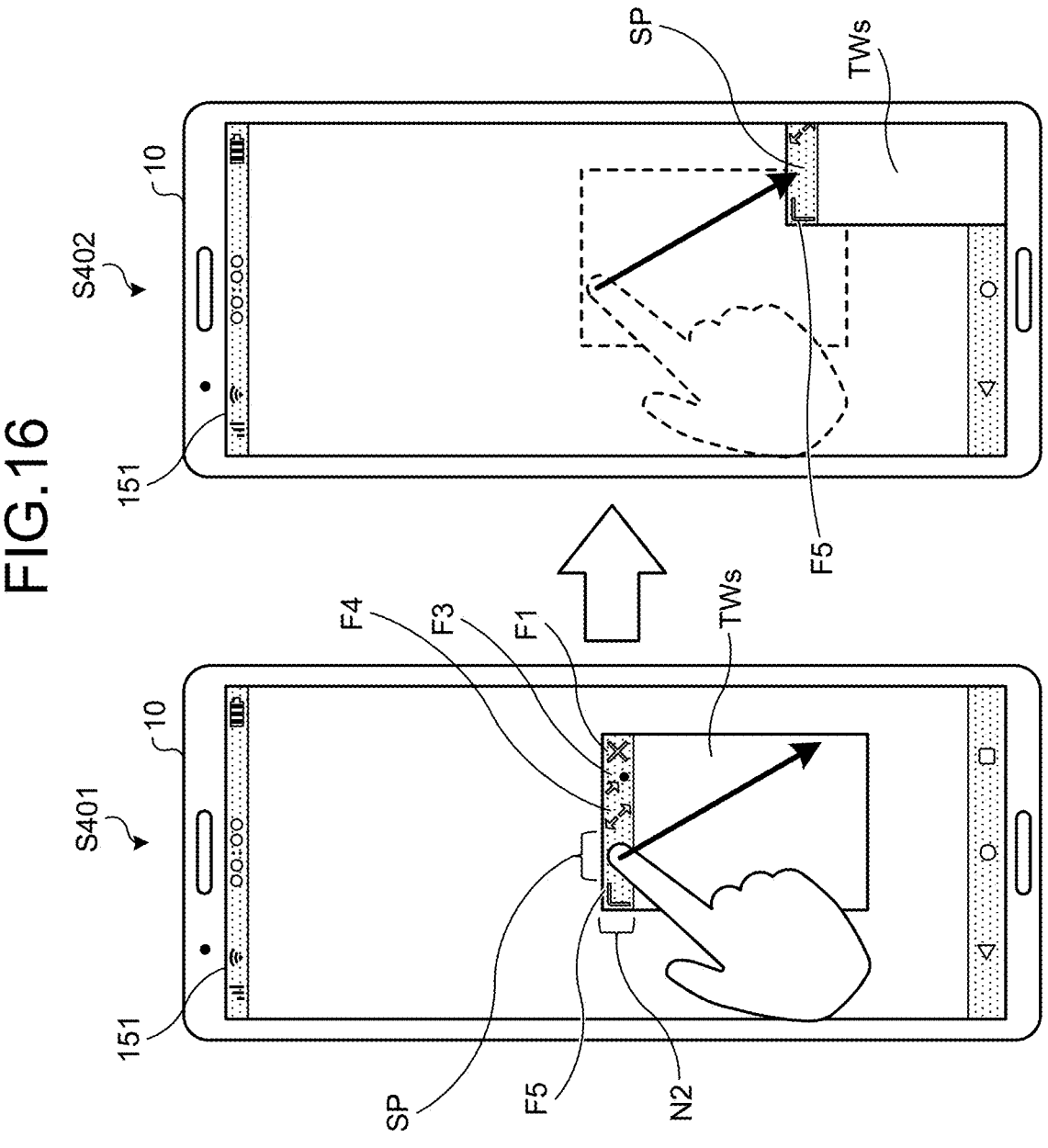
FIG. 16 is a diagram illustrating a state in which a temporary window TWs moves.

As described above, the position and the size of the temporary window TWs can be changed. FIG. 16 is a diagram illustrating a state in which the temporary window TWs moves. In the state S401 of FIG. 16, the temporary window TWs is displayed on the display screen 151. Note that, in the example of FIG. 16, the main window is not illustrated in order to facilitate visual recognition of the movement of the temporary window TWs.

The terminal device 10 moves the temporary window TWs based on the movement operation by the user using the non-display region SP. The movement operation is, for example, an operation in which the user slides (swipes) the finger while touching the non-display region SP. The terminal device 10 moves the temporary window TWs in accordance with the movement operation by the user (state S402).

At this time, the user can cause part of the temporary window TWs to be out of the display screen 151. That is, the terminal device 10 of the present embodiment is configured to be able to move the temporary window TWs beyond at least one of the upper end, the lower end, the left end, and the right end of the display screen 151. At this time, the terminal device 10 desirably moves the temporary window TWs so that at least part of the non-display region SP remains in the display screen 151.

When part of the temporary window TWs is out of the display screen 151, part of the navigation bar N2 is out of the display screen 151 and is not displayed. As described above, the non-display region SP and the plurality of function icons are displayed on the navigation bar N2. At this time, when the non-display region SP and the function icon F5 (resize button) is out of the display screen 151, the user cannot change the position and the size of the temporary window TWs thereafter. Therefore, at least one of the non-display region SP and the function icon F5 has to remain on the display screen 151. As a result, movement of the temporary window TWs is limited.

Therefore, the terminal device 10 according to the present embodiment changes the display aspect of the temporary window TWs according to the situation so that the movable region of the temporary window TWs on the display screen 151 increases. For example, the terminal device 10 changes the display position of the navigation bar N and the arrangement of function icons based on the position of the temporary window TWs on the display screen 151. Hereinafter, the operation of the terminal device 10 will be described with reference to the drawings.

<4-3-2. Change in Display Aspect in Lateral Movement in Longitudinal State>

Figure 17:
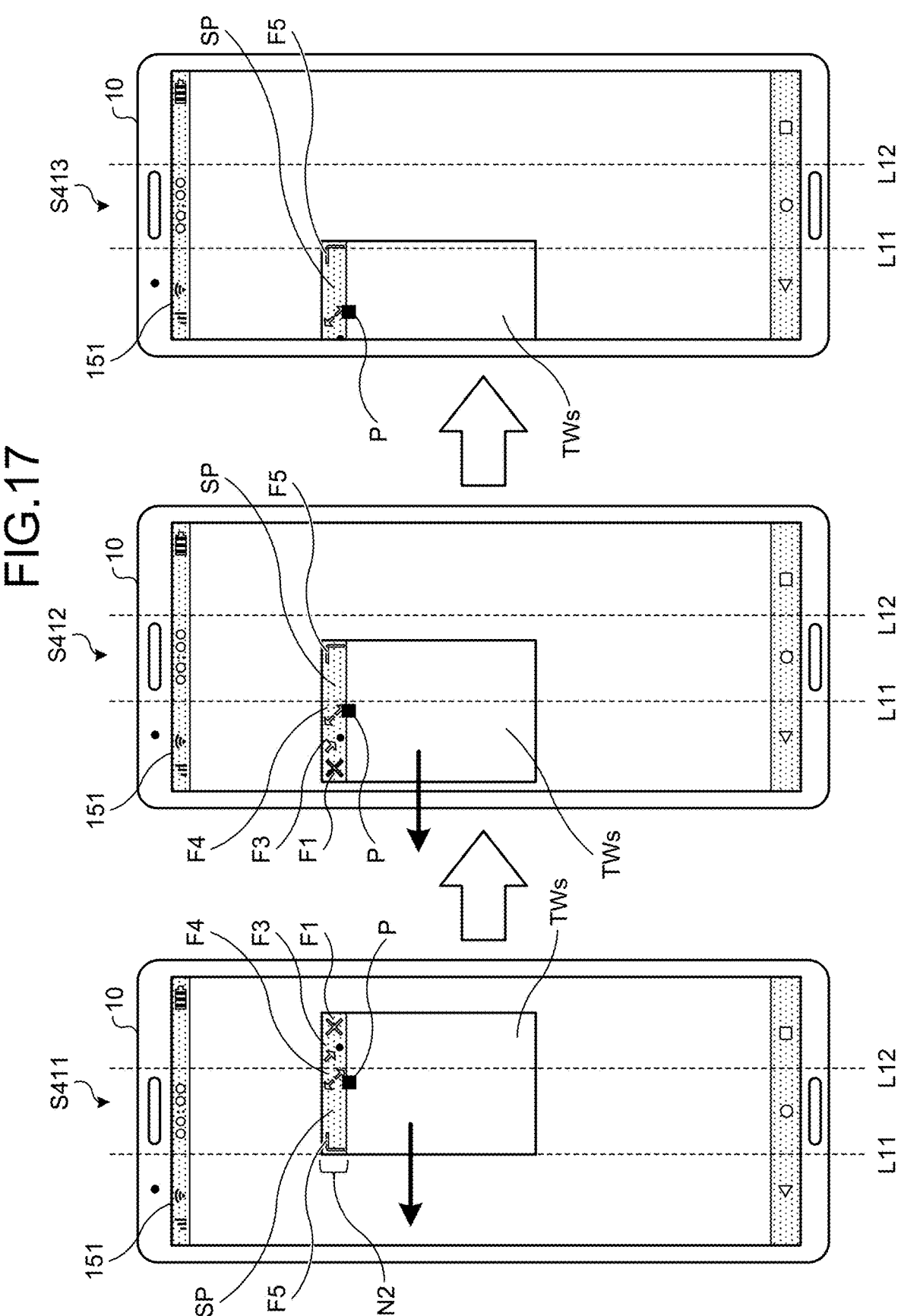
FIG. 17 is a diagram illustrating a state in which the temporary window TWs moves laterally in a case where the display screen is in a longitudinal state.
Figure 18:
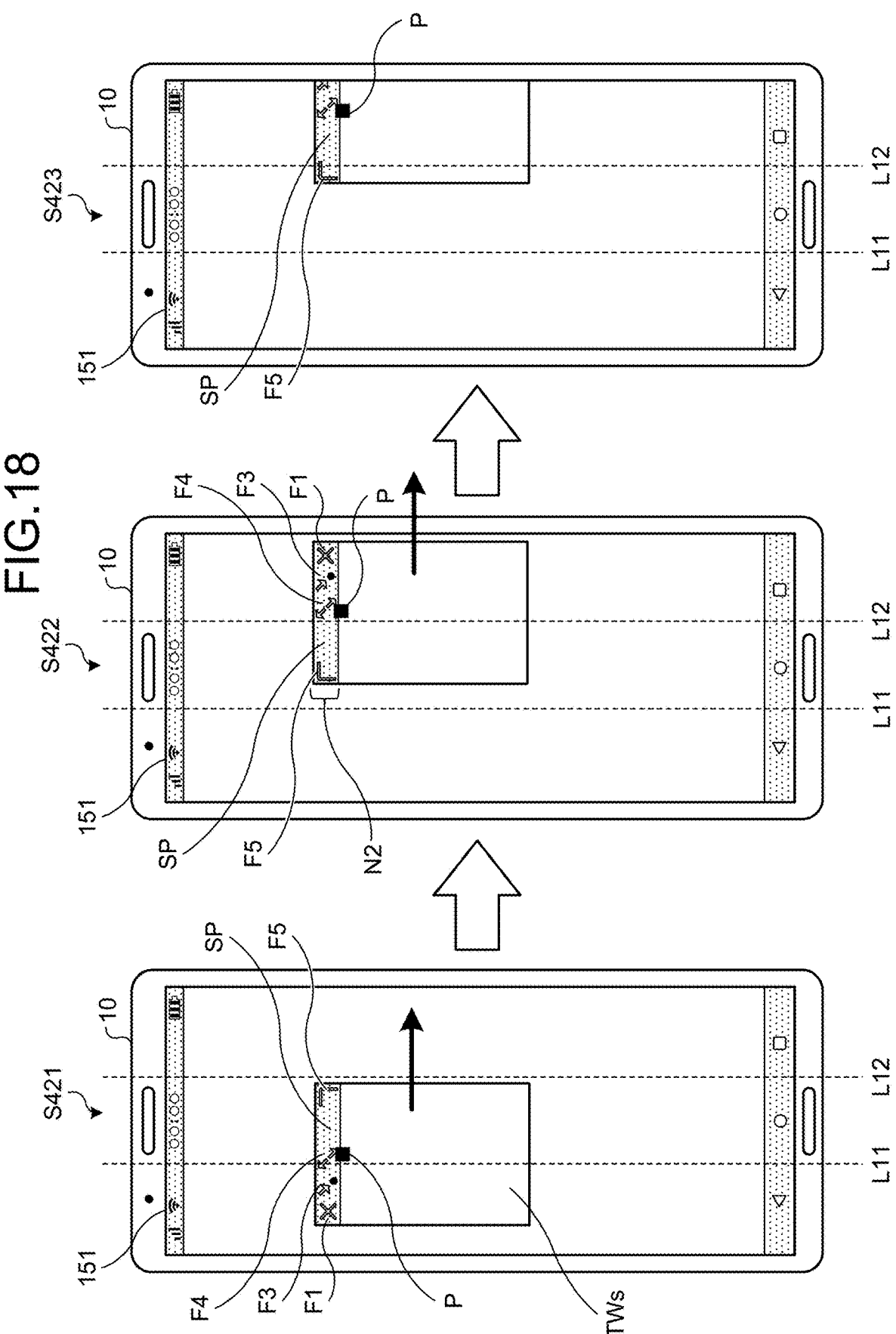
FIG. 18 is a diagram illustrating a state in which the temporary window TWs moves laterally in a case where the display screen is in a longitudinal state.

First, a change in the display aspect of the temporary window TWs in a case where the temporary window TWs moves laterally in the longitudinal state of the display screen 151 will be described. FIGS. 17 and 18 are diagrams illustrating a state in which the temporary window TWs moves laterally in a case where the display screen 151 is in the longitudinal state. FIG. 17 illustrates a state in which the temporary window TWs has moved in the left direction, and FIG. 18 illustrates a state in which the temporary window TWs has moved in the right direction. Here, the longitudinal state is a state in which the longitudinal direction of the display screen 151 is the vertical direction as illustrated in FIGS. 17 and 18.

In the longitudinal state, the navigation bar N2 is located in the upper end region or the lower end region of the temporary window TWs. In the case of the lateral movement, the terminal device 10 changes the display order of the plurality of function icons on the navigation bar N2 based on the information about the position of the temporary window TWs in the display screen 151.

(1) Movement in Left Direction

First, the leftward movement of the temporary window TWs will be described with reference to FIG. 17. In the example of FIG. 17, the navigation bar N2 is disposed in the upper end region of the temporary window TWs, but may be disposed in the lower end region.

Note that, in the following description, the position of the temporary window TWs on the display screen 151 is defined by a pivot P. The position of the pivot P is at a position in the display region of the temporary window TWs. The pivot P is at a fixed position on the temporary window TWs and moves in accordance with the movement of the temporary window TWs. In the present embodiment, as an example, it is assumed that the pivot P is located at the upper center of the temporary window TWs. More specifically, as illustrated in FIG. 17, the pivot P is located at an upper side of a region, of the temporary window TWs, excluding the navigation bar N2, at the center of the temporary window TWs in the lateral direction. Note that, in the present embodiment, the position of the pivot P is illustrated on the drawing, but this is merely for facilitating understanding of the present embodiment, and the pivot P is not actually displayed on the display screen 151.

In addition, FIG. 17 illustrates a line L11 at a position shifted left by a predetermined distance from the center in the lateral direction and a line L12 at a position shifted right by a predetermined position from the center in the lateral direction along the longitudinal direction of the display screen 151. These lines are lines that trigger a change in the display order of the plurality of function icons. When the pivot P reaches the range from the right end of the display screen 151 to the line L11 or the range from the left end of the display screen 151 to the line L12, the terminal device 10 changes the display order of the plurality of function icons. A portion between the line L11 and the line L12 indicates hysteresis for preventing the display order of the plurality of function icons from being frequently changed. These lines are merely intended to facilitate understanding of the present embodiment, and are not actually displayed on the display screen 151.

In a state S411 of FIG. 17, the temporary window TWs is displayed. Note that, in the example of FIG. 17, the main window is not illustrated in order to facilitate visual recognition of the movement of the temporary window TWs. In the example of the state S411, the navigation bar N2 is located at the upper end region of the temporary window TWs. Then, the display order of the function icons in the navigation bar N2 is the function icon F1, the function icon F3, the function icon F4, and the function icon F5 from the right.

The terminal device 10 moves the temporary window TWs in the left direction according to the operation by the user. Then, when the pivot P of the temporary window TWs reaches the line L11, the display order of the plurality of function icons on the navigation bar N2 is changed (state S412). In the example of the state S412, the terminal device 10 changes the function icon F5 used for resizing the temporary window TWs to a position farthest from the left end of the display screen 151. More specifically, the terminal device 10 changes the display order of the function icons in the navigation bar N2 to the function icon F5, the function icon F4, the function icon F3, and the function icon F1 from the right. As the display order of the plurality of function icons is changed, the non-display region SP where no function icon is displayed is also located far from the left end of the display screen 151.

The terminal device 10 further moves the temporary window TWs in the left direction according to the operation by the user (state S413). Since the function icon F5 and the non-display region SP have moved to a position far from the left end of the display screen 151, the terminal device 10 can increase the movement range of the lower side of the temporary window TWs. For example, the terminal device 10 can cause the temporary window TWs to be greatly out of the left end of the display screen 151.

(2) Movement Right Direction

Next, the leftward movement of the temporary window TWs will be described with reference to FIG. 18. In the example of FIG. 18, the navigation bar N2 is disposed in the upper end region of the temporary window TWs, but may be disposed in the lower end region. Furthermore, the position of the temporary window TWs on the display screen 151 is defined by the pivot P, as in the example of FIG. 17. As in the example of FIG. 17, the lines that trigger the change of the display order of the plurality of function icons are the line L11 and the line L12.

In a state S421 of FIG. 18, a temporary window TWs is displayed. Note that, in the example of FIG. 18, the main window is not illustrated in order to facilitate visual recognition of the movement of the temporary window TWs. In the example of a state S422, the navigation bar N2 is located at the upper end region of the temporary window TWs. Then, the display order of the function icons in the navigation bar N2 is the function icon F1, the function icon F3, the function icon F4, and the function icon F5 from the left.

The terminal device 10 moves the temporary window TWs in the right direction according to the operation by the user. Then, when the pivot P of the temporary window TWs reaches the line L12, the display order of the plurality of function icons on the navigation bar N2 is changed (state S422). In the example of the state S422, the terminal device 10 changes the function icon F5 to the position farthest from the right end of the display screen 151. More specifically, the terminal device 10 changes the display order of the function icons in the navigation bar N2 to the function icon F5, the function icon F4, the function icon F3, and the function icon F1 from the left. As the display order of the plurality of function icons is changed, the non-display region SP where no function icon is displayed is also located far from the right end of the display screen 151.

The terminal device 10 further moves the temporary window TWs in the right direction according to the operation by the user (state S423). Since the function icon F5 and the non-display region SP have moved to a position far from the right end of the display screen 151, the terminal device 10 can increase the movement range of the right side of the temporary window TWs. For example, the terminal device 10 can cause the temporary window TWs to be greatly out of the right end of the display screen 151.

<4-3-3. Change in Display Aspect in Case of Longitudinal Movement in Longitudinal State>

Figure 19:
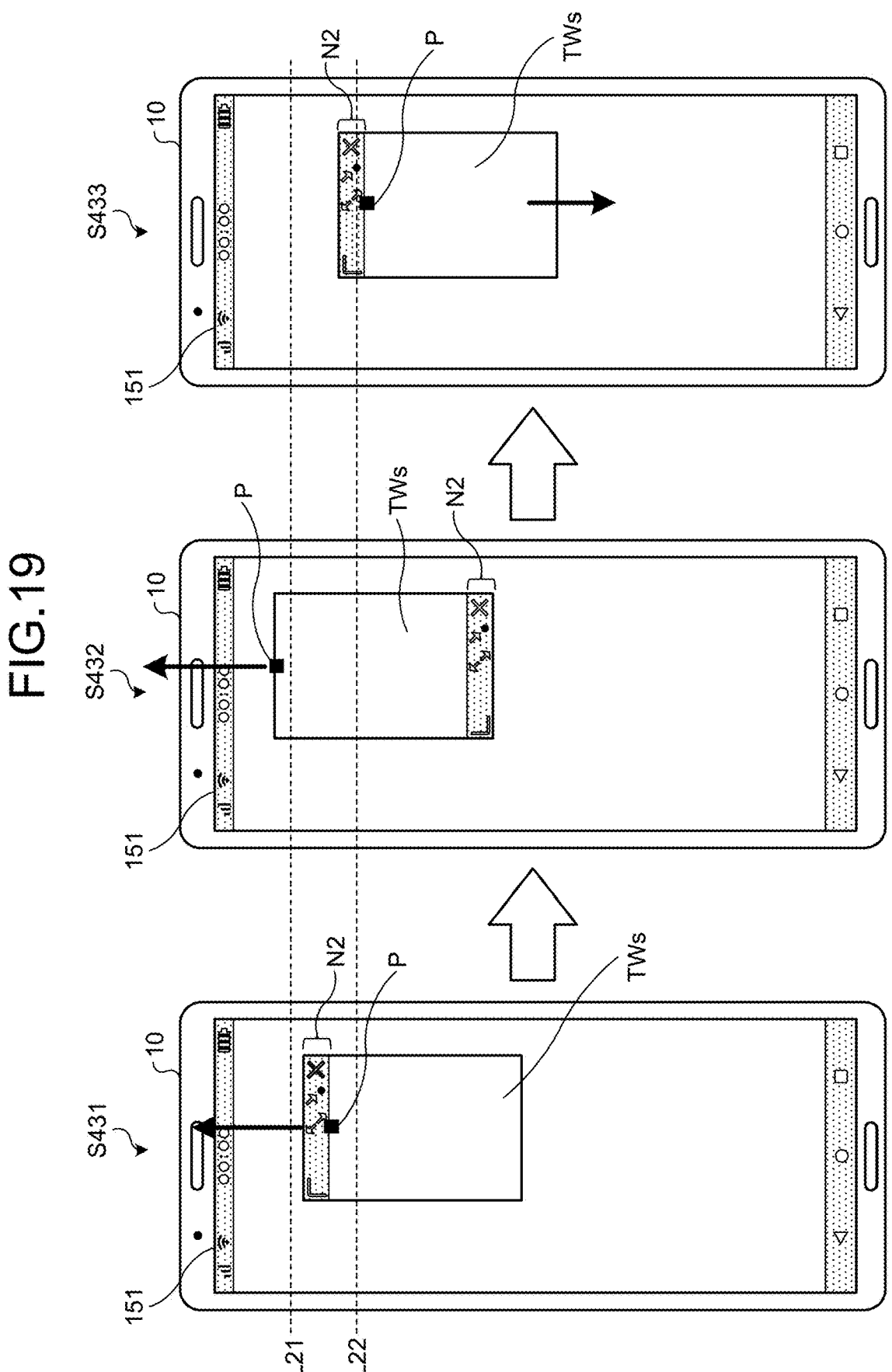
FIG. 19 is a diagram illustrating a state in which the temporary window TWs moves longitudinally in a case where the display screen is in a longitudinal state.

Next, a change in the display aspect of the temporary window TWs when the temporary window TWs moves longitudinally while the display screen 151 is in the longitudinal state will be described. FIG. 19 is a diagram illustrating a state in which the temporary window TWs moves longitudinally in a case where the display screen 151 is in the longitudinal state.

In the longitudinal state, the navigation bar N2 is located in the upper end region or the lower end region of the temporary window TWs. In the case of the longitudinal movement, the terminal device 10 changes the position of the navigation bar N2 to another end region based on the information about the position of the temporary window TWs in the display screen 151.

The position of the temporary window TWs on the display screen 151 is defined by the pivot P, as in the example of FIG. 17. In addition, FIG. 19 illustrates a line L21 and a line L22 along the short direction of the display screen 151 at positions spaced apart from each other both of which are located at upper part. These lines are lines that trigger a change in the display position of the navigation bar N2. When the pivot P reaches the range from the upper end of the display screen 151 to the line L21 or the range from the lower end of the display screen 151 to the line L22, the terminal device 10 changes the display order of the plurality of function icons. A portion between the line L21 and the line L22 indicates hysteresis for preventing the position of the navigation bar N2 from being frequently switched.

In a state S431 of FIG. 19, the temporary window TWs is displayed. Note that, in the example of FIG. 19, the main window is not illustrated in order to facilitate visual recognition of the movement of the temporary window TWs. In the example of the state S431, the navigation bar N2 is located at the upper end region of the temporary window TWs.

The terminal device 10 moves the temporary window TWs upward according to the operation by the user. Then, when the pivot P of the temporary window TWs reaches the line L21, the position of the navigation bar N2 is changed (state S432). In the example of the state S432, the terminal device 10 changes the navigation bar N2 from the upper end region of the temporary window TWs to the lower end region so that the position of the navigation bar N2 is far from the upper end of the display screen 151. Since the navigation bar N2 has moved to a position far from the upper end of the display screen 151, the terminal device 10 can increase the movement range of the upper side of the temporary window TWs. For example, the terminal device 10 can cause the temporary window TWs to be greatly out of the upper end of the display screen 151.

Next, the terminal device 10 moves the temporary window TWs downward according to the operation by the user. Then, when the pivot P of the temporary window TWs reaches the line L22, the position of the navigation bar N2 is changed (state S433). In the example of the state S433, the terminal device 10 changes the navigation bar N2 from the lower end region to the upper end region of the temporary window TWs so that the position of the navigation bar N2 is far from the lower end of the display screen 151. Since the navigation bar N2 has moved to a position far from the lower end of the display screen 151, the terminal device 10 can increase the movement range of the lower side of the temporary window TWs. For example, the terminal device 10 can cause the temporary window TWs to be greatly out of the lower end of the display screen 151.

<4-3-4. Change in Display Aspect in Lateral State>

In the above-described embodiment, the display screen 151 is in the longitudinal state, but the display screen 151 may also be in the lateral state. Here, the lateral state is a state in which the longitudinal direction of the display screen 151 is the lateral direction. Hereinafter, a change in the display aspect of the temporary window TWs when the temporary window TWs moves while the display screen 151 is in the lateral state will be described.

Figure 20:
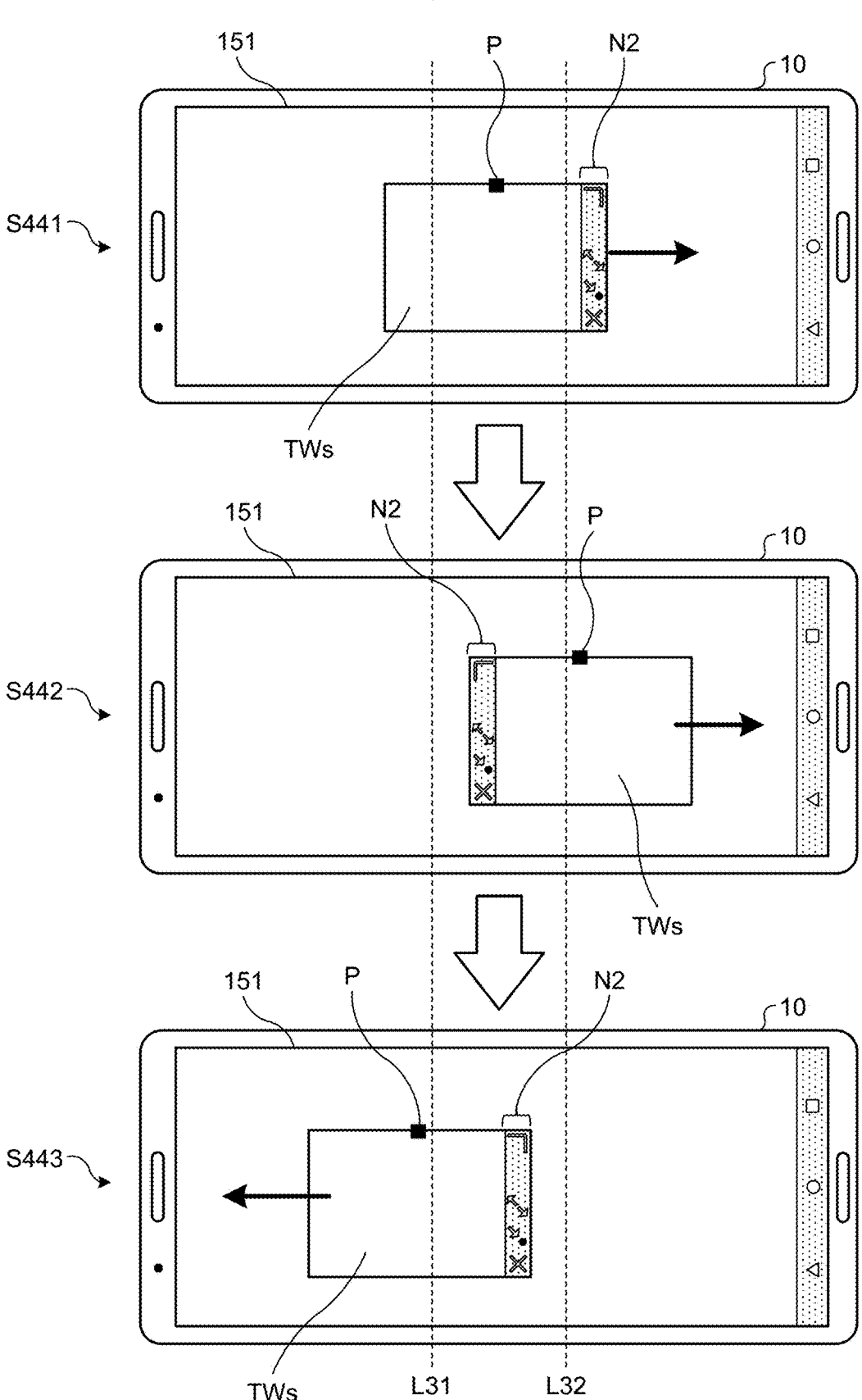
FIG. 20 is a diagram illustrating a state in which the temporary window TWs moves laterally in a case where the display screen is in the lateral state.

First, a change in the display aspect of the temporary window TWs when the temporary window TWs moves laterally will be described. FIG. 20 is a diagram illustrating a state in which the temporary window TWs moves laterally in a case where the display screen 151 is in the lateral state.

In the lateral state, the navigation bar N2 is located at the left end region or the right end region of the temporary window TWs. In the case of the lateral movement, the terminal device 10 changes the position of the navigation bar N2 to another end region based on the information about the position of the temporary window TWs in the display screen 151.

The position of the temporary window TWs on the display screen 151 is defined by the pivot P, as in the example of FIG. 17. In the example of FIG. 20, the pivot P is located at the upper center. In addition, FIG. 20 illustrates a line L31 at a position shifted left by a predetermined distance from the center in the lateral direction and a line L32 at a position shifted right by a predetermined position from the center in the lateral direction along the longitudinal direction of the display screen 151. These lines are lines that trigger a change in the display position of the navigation bar N2. When the pivot P reaches the range from the left end of the display screen 151 to the line L31 or the range from the right end of the display screen 151 to the line L32, the terminal device 10 changes the display order of the plurality of function icons. A portion between the line L31 and the line L32 indicates hysteresis for preventing the position of the navigation bar N2 from being frequently switched.

In a state S441 of FIG. 20, the temporary window TWs is displayed. Note that, in the example of FIG. 20, the main window is not illustrated in order to facilitate visual recognition of the movement of the temporary window TWs. In the example of the state S441, the navigation bar N2 is located at the right end region of the temporary window TWs.

The terminal device 10 moves the temporary window TWs in the right direction according to the operation by the user. Then, when the pivot P of the temporary window TWs reaches the line L32, the position of the navigation bar N2 is changed (state S442). In the example of the state S442, the terminal device 10 changes the navigation bar N2 from the right end region to the left end region of the temporary window TWs so that the position of the navigation bar N2 is far from the right end of the display screen 151. Since the navigation bar N2 has moved to a position far from the right end of the display screen 151, the terminal device 10 can increase the movement range of the right side of the temporary window TWs. For example, the terminal device 10 can cause the temporary window TWs to be greatly out of the right end of the display screen 151.

Next, the terminal device 10 moves the temporary window TWs in the left direction according to the operation by the user. Then, when the pivot P of the temporary window TWs reaches the line L31, the position of the navigation bar N2 is changed (state S443). In the example of the state S443, the terminal device 10 changes the navigation bar N2 from the left end region to the right end region of the temporary window TWs so that the position of the navigation bar N2 is far from the left end of the display screen 151. Since the navigation bar N2 has moved to a position far from the left end of the display screen 151, the terminal device 10 can increase the movement range of the left side of the temporary window TWs. For example, the terminal device 10 can cause the temporary window TWs to be greatly out of the left end of the display screen 151.

Even when the temporary window TWs moves longitudinally, the display aspect of the temporary window TWs may be changed. Specifically, the operation of the terminal device 10 is similar to the operation in a case where the temporary window TWs moves laterally while the display screen 151 is in the longitudinal state. Specifically, the terminal device 10 changes the display order of the plurality of function icons on the navigation bar N2 based on the position (pivot P) of the temporary window TWs in the display screen 151. For example, the terminal device 10 displays a plurality of function icons in either the left end region or the right end region of the temporary window TWs. Then, in a case where the temporary window TWs reaches a predetermined range from the upper end or the lower end of the display screen 151 with the longitudinal movement of the temporary window TWs, the terminal device 10 changes the display order of the plurality of function icons on the navigation bar N2. Specifically, the terminal device 10 moves the positions of the function icon F5 and the non-display region SP to a position far from the upper end or the lower end of the display screen 151, as in the examples of FIGS. 17 and 18. As a result, the terminal device 10 can increase the moving range of the upper side or the lower side of the temporary window TWs.

5. MODIFICATIONS

The above-described embodiment illustrates an example, and various modifications and applications are possible.

For example, in the above-described embodiment, when the pivot P exceeds the predetermined line by the movement of the temporary window TWs, the terminal device 10 changes the position of the navigation bar N2 or changes the display order of the plurality of function icons on the navigation bar N2. However, even in a case where the pivot P exceeds a predetermined line due to resizing of the temporary window TWs, the terminal device 10 may change the position of the navigation bar N2 or change the display order of the plurality of function icons on the navigation bar N2.

Figure 21:
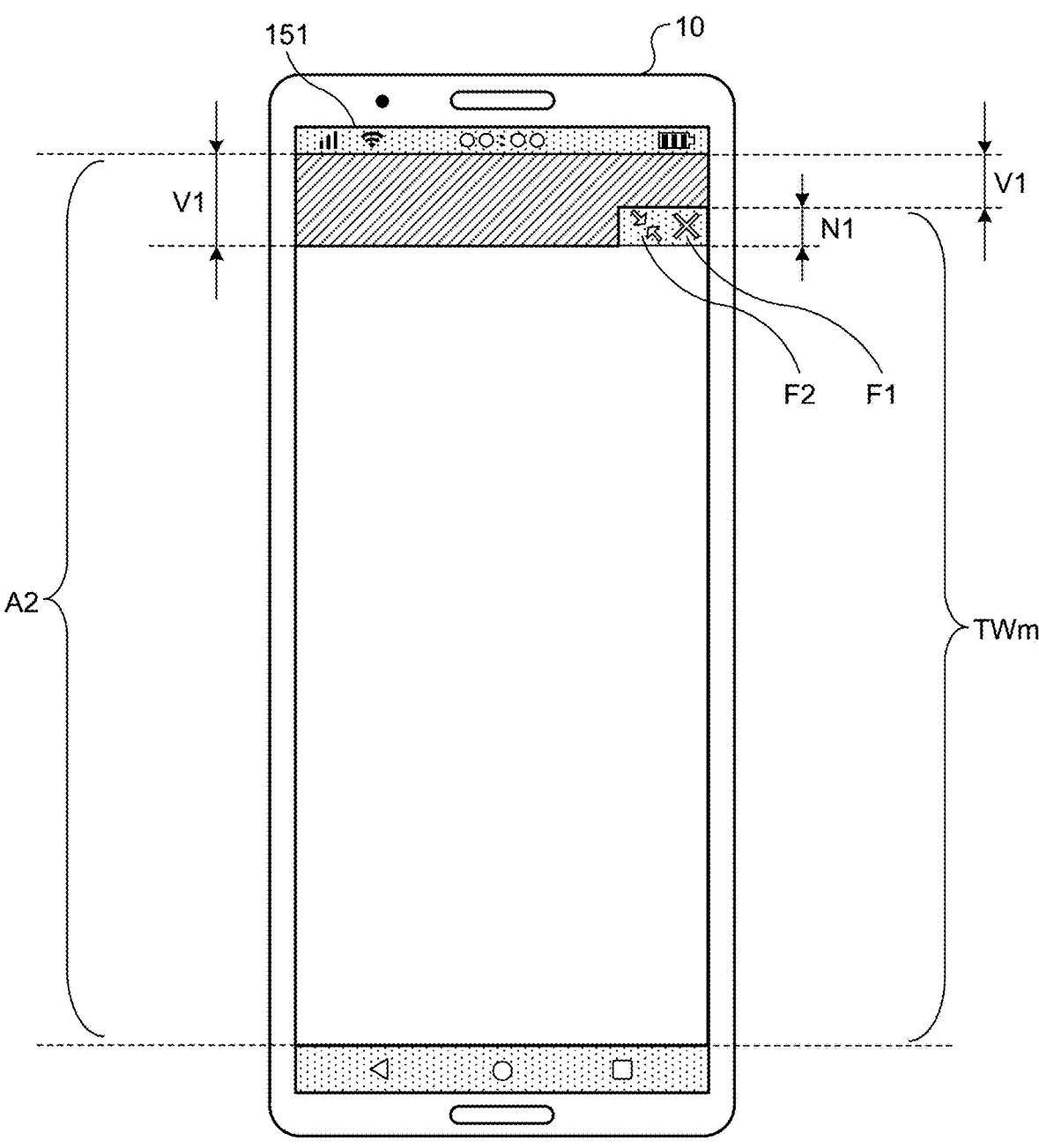
FIG. 21 is a diagram illustrating another example of a temporary window TWm.

Furthermore, in the above-described embodiment, the windows illustrated in FIGS. 1 and 8 have been exemplified as an example of the temporary window TWm (first window). However, the form of the temporary window TWm is not limited to the example illustrated in FIGS. 1 and 8. FIG. 21 is a diagram illustrating another example of the temporary window TWm. In the temporary window TWm illustrated in FIG. 21, the region of the navigation bar N2 is a protruding region. More specifically, the width of the navigation bar N2 in the lateral direction is reduced to a width in which the function icons can be disposed, as compared with the width of the navigation bar N2 illustrated in FIG. 8 in the lateral direction. Then, at a portion other than the navigation bar N2 (protruding region) at the upper portion of the temporary window TWm, part of the application screen behind is the visually-recognizable region V1. In a case where the user performs an operation on a portion (shaded portion) other than the protruding region of the upper portion of the temporary window TWm during the TWm mode, the terminal device 10 causes the display mode of the temporary window to transition from the TWm mode (first display mode) to the TWs mode (second display mode). By reducing the size of the navigation bar N2, the visually-recognizable region V1 increases, so that the user can easily tap this portion. As a result, the transition of the display mode of the temporary window is facilitated.

The control device that controls the terminal device 10 of the present embodiment may be realized by a dedicated computer system or may be realized by a general-purpose computer system.

For example, a communication program for executing the above-described operation is stored and distributed in a computer-readable recording medium such as an optical disk, a semiconductor memory, a magnetic tape, or a flexible disk. Then, for example, the control device is configured by installing the program in a computer and executing the above-mentioned process. At this time, the control device may be a device (for example, a personal computer) outside the terminal device 10. Furthermore, the control device may be a device (for example, the control unit 13) inside the terminal device 10.

Further, the communication program may be stored in a disk device provided in a server device on a network such as the Internet so that it can be downloaded to a computer or the like. Further, the above-mentioned function may be realized by the operating system (OS) in conjunction with the application software. In this case, the part other than the OS may be stored in a medium and distributed, or the part other than the OS may be stored in the server device so that it can be downloaded to a computer or the like.

Further, in the above embodiment, it is also possible to manually perform all or part of the process described as being performed automatically of respective processes described, alternatively, it is also possible to automatically perform all or part of the process described as being performed manually by a known method. In addition, the processing procedure, specific name, and information including various pieces of data and parameters illustrated in the above document and drawings can be arbitrarily changed unless otherwise specified. For example, the various types of information illustrated in each figure are not limited to the illustrated information.

Further, each component of each of the illustrated devices is a functional concept, and does not necessarily have to be physically configured as illustrated in the figure. That is, the specific form of distribution/integration of the device is not limited to the one illustrated in the figure, and all or part of the device can be functionally or physically dispersed/integrated in any unit according to various loads and usage conditions.

In addition, the above-described embodiments can be appropriately combined in a region in which the processing contents do not contradict each other. In addition, the order of each processing of the above-described embodiments can be appropriately changed.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of part of the device).

Furthermore, for example, the present embodiment can adopt a configuration of cloud computing in which one function is shared and processed by a plurality of devices in cooperation via a network.

6. CONCLUSION

As described above, according to an embodiment of the present disclosure, the terminal device 10 displays the temporary window in a superimposed manner on the main window based on the operation by the user so that the user can visually recognize at least part of the main window in the display screen 151. The display modes of the temporary window include the TWm mode (first display mode) in which the temporary window TWm having a fixed position and a fixed size is displayed, and the TWs mode (second display mode) in which a temporary window TWm having a variable position and a variable size is displayed. The temporary window allows the user to perform a temporary operation while maintaining the main window. As a result, trouble such as resetting of the main window can be saved, and the convenience of the terminal device 10 is improved.

The embodiments of the present disclosure have been described above, the technical scope of the present disclosure is not limited to the above-described embodiments as they are, and various changes can be made without departing from the gist of the present disclosure. Moreover, the components over different embodiments and modifications may be suitably combined.

Further, the effects in each embodiment described in the present specification are merely examples and are not limited, and other effects may be present.

The present technology may also be configured as below.

(1)

An information processing device comprising:

a display control unit that displays an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and wherein the display control unit displays a first window having a fixed position and a fixed size as the application window in the first display mode, and displays a second window having a variable position and a variable size as the application window in the second display mode.

(2)

The information processing device according to (1), wherein the display control unit causes the display mode of the application window to transition from the first display mode to the second display mode or from the second display mode to the first display mode based on an operation by the user.

(3)

The information processing device according to (2), wherein the display control unit causes the display mode of the application window to transition from the first display mode to the second display mode in a case where the user performs an operation on a visually-recognizable region of the application screen during the first display mode.

(4)

The information processing device according to any one of (1) to (3), wherein the display control unit displays one or a plurality of function icons related to a window operation in the application window.

(5)

The information processing device according to (4), wherein at least one of the one or the plurality of function icons displayed in the first window is different from the plurality of function icons displayed in the second window.

(6)

The information processing device according to (4) or (5), wherein the number of function icons displayed in the first window is smaller than the number of function icons displayed in the second window.

(7)

The information processing device according to (6), wherein the first window has a protruding region for displaying the one or the plurality of function icons at an upper portion, and at a portion other than the protruding region at the upper portion of the first window, part of the application screen behind is visually-recognizable, and wherein the display control unit causes the display mode of the application window to transition from the first display mode to the second display mode in a case where the user performs an operation on a portion other than the protruding region of the upper portion of the first window during the first display mode.

(8)

The information processing device according to any one of (4) to (7), wherein the display control unit displays the one or the plurality of function icons in any one of an upper end region, a lower end region, a left end region, and a right end region of an end region of the second window when at least the second window is focused.

(9)

The information processing device according to (8), wherein when the focus shifts from the second window to another window, the display control unit erases the end region in which the one or the plurality of function icons is displayed.

(10)

The information processing device according to (8) or (9), wherein the display control unit moves a position of the second window based on a movement operation, by the user, for moving the second window, wherein the movement operation is an operation using a non-display region where no function icon is displayed in the end region in which the one or the plurality of function icons is displayed, and wherein the display control unit is configured to move the second window beyond at least one of an upper end, a lower end, a left end, and a right end of the display screen so that at least part of the non-display region remains in the display screen.

(11)

The information processing device according to (10), wherein the display control unit changes the end region in which the one or the plurality of function icons is displayed to another end region based on information related to a position of the second window in the display screen.

(12)

The information processing device according to (11), wherein the display control unit displays the one or the plurality of function icons in either the upper end region or the lower end region of the second window when a display state of the display screen is a longitudinal state, and when it is determined that the second window reached a predetermined range from an upper end of the display screen, changes the end region for displaying the one or the plurality of function icons from the upper end region to the lower end region.

(13)

The information processing device according to (11) or (12), wherein the display control unit displays the one or the plurality of function icons in either the left end region or the right end region of the second window when a display state of the display screen is a lateral state, and when it is determined that the second window reached a predetermined range from a left end of the display screen, changes the end region for displaying the one or the plurality of function icons from the left end region to the right end region.

(14)

The information processing device according to any one of (10) to (13), wherein the display control unit changes a display order of the plurality of function icons in the end region based on information related to a position of the second window in the display screen.

(15)

The information processing device according to (14), wherein the display control unit displays the plurality of function icons in either the upper end region or the lower end region of the second window when a display state of the display screen is a longitudinal state, and changes a display order of the plurality of function icons in the end region when the second window reaches a predetermined range from a left end or a right end of the display screen.

(16)

The information processing device according to (14) or (15), wherein the display control unit displays the plurality of function icons in either the left end region or the right end region of the second window when a display state of the display screen is a lateral state, and changes a display order of the plurality of function icons in the end region when the second window reaches a predetermined range from an upper end or a lower end of the display screen.

(17)

The information processing device according to any one of (1) to (16), further comprising:

a notification unit that makes notification to the user while the application screen is being displayed, wherein the display control unit displays, in a superimposed manner on the application screen, the first window in which display related to the notification is performed while maintaining the application screen in a case where the user performs an operation of performing display related to the notification after the notification to the user is made.

(18)

The information processing device according to any one of (1) to (17), wherein the display control unit displays a user interface for opening an application in the second display mode, wherein the user interface displays a first box representing a display region of the application screen and a second box representing the second window, wherein an icon of a selected application selected by the user by an operation by the user is configured to be displayed in the second box, and wherein the display control unit displays, in a superimposed manner on the application screen, the second window in which display related to the selected application is performed when the display operation of the icon in the second box is performed.

(19)

An information processing method comprising:

a display control step of displaying an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and wherein the display control step includes displaying a first window having a fixed position and a fixed size as the application window in the first display mode, and displays a second window having a variable position and a variable size as the application window in the first display mode.

(20)

A program causing a computer to function as:

a display control unit that displays an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and wherein the display control unit displays a first window having a fixed position and a fixed size as the application window in the first display mode, and displays a second window having a variable position and a variable size as the application window in the second display mode.

REFERENCE SIGNS LIST

10 TERMINAL DEVICE
11 COMMUNICATION UNIT
12 STORAGE UNIT
13 CONTROL UNIT
14 INPUT UNIT
15 OUTPUT UNIT
131 NOTIFICATION UNIT
132 DISPLAY CONTROL UNIT
141, 142 SENSOR REGION
151 DISPLAY SCREEN
A1 UPPER REGION
A2 CENTRAL REGION
A3 LOWER REGION
B1 to B4 BOX
C1, C2, C3, TWi ICON
F1 to F5 FUNCTION ICON
SP NON-DISPLAY REGION
SW, MW1, MW2 MAIN WINDOW
T1 ACTIVATION BUTTON
TWm, TWs, TWs-p TEMPORARY WINDOW
L11, L12, L21, L22, L31, L32 LINE
N1, N2 NAVIGATION BAR
V1 VISUALLY-RECOGNIZABLE REGION

The invention claimed is:

1. An information processing device comprising:
processing circuitry configured to display an application window in a superimposed manner on an application screen so that a user is allowed to visually recognize at least part of the application screen in a display screen based on an operation by the user, wherein

28 a display mode of the application window includes at least a first display mode and a second display mode that are different in a display aspect of the application window, and the processing circuitry is further configured to display a first window having a fixed position and a fixed size as the application window in the first display mode, display a second window having a variable position and a variable size as the application window in the second display mode, display one or a plurality of function icons related to a window operation in the application window, determine that at least the second window is focused, display the one or the plurality of function icons in any one of an upper end region, a lower end region, a left end region, and a right end region of an end region of the second window based on the determination that the at least the second window is focused, move a position of the second window based on a movement operation, by the user, for moving the second window, the movement operation being an operation using a non-display region where no function icon is displayed in the end region in which the one or the plurality of function icons is displayed, move the second window beyond at least one of an upper end, a lower end, a left end, and a right end of the display screen so that at least part of the non-display region remains in the display screen, change a display order of the plurality of function icons in the end region based on information related to a position of the second window in the display screen, determine that a display state of the display screen is a lateral state, display the plurality of function icons in either the left end region or the right end region of the second window based on the determination that the display state of the display screen is the lateral state, determine that the second window reaches a predetermined range from an upper end or a lower end of the display screen, and change a display order of the plurality of function icons in the end region based on the determination that the second window reaches the predetermined range from the upper end or the lower end of the display screen.

2. The information processing device according to claim 1, wherein the processing circuitry is configured to cause the display mode of the application window to transition from the first display mode to the second display mode or from the second display mode to the first display mode based on an operation by the user.

3. The information processing device according to claim 2, wherein the processing circuitry is configured to:

determine that the user performs an operation on a visually-recognizable region of the application screen during the first display mode, and cause the display mode of the application window to transition from the first display mode to the second display mode based on the determination that the user performs the operation on the visually-recognizable region of the application screen during the first display mode.

4. The information processing device according to claim 1, wherein at least one of the one or the plurality of function icons displayed in the first window is different from the plurality of function icons displayed in the second window.

5. The information processing device according to claim 1, wherein a number of function icons displayed in the first window is smaller than a number of function icons displayed in the second window.

6. The information processing device according to claim 5, wherein the first window has a protruding region for displaying the one or the plurality of function icons at an upper portion, at a portion other than the protruding region of the upper portion of the first window, part of the application screen behind is visually-recognizable, and the processing circuitry is configured to determine that the user performs an operation on the portion other than the protruding region of the upper portion of the first window during the first display mode, and cause the display mode of the application window to transition from the first display mode to the second display mode based on the determination that the user performs the operation on the portion other than the protruding region of the upper portion of the first window during the first display mode.

7. The information processing device according to claim 1, wherein the processing circuitry is configured to:

determine that focus shifts from the second window to another window, and erase the end region in which the one or the plurality of function icons is displayed based on the determination that the focus shifts from the second window to another window.

8. The information processing device according to claim 1, wherein the processing circuitry is configured to change the end region in which the one or the plurality of function icons is displayed to another end region based on information related to a position of the second window in the display screen.

9. The information processing device according to claim 8, wherein the processing circuitry is configured to:

determine that a display state of the display screen is a longitudinal state, display the one or the plurality of function icons in either the upper end region or the lower end region of the second window based on the determination that the display state of the display screen is the longitudinal state, determine that the second window reaches a predetermined range from an upper end of the display screen, and change the end region for displaying the one or the plurality of function icons from the upper end region to the lower end region based on the determination that the second window reaches the predetermined range from the upper end of the display screen.

10. The information processing device according to claim 8, wherein the processing circuitry is configured to:

determine that the second window reaches a predetermined range from a left end of the display screen, and change the end region for displaying the one or the plurality of function icons from the left end region to the right end region based on the determination that the second window reaches the predetermined range from the left end of the display screen.

11. The information processing device according to claim 1, wherein the processing circuitry is configured to:

determine that a display state of the display screen is a longitudinal state, display the plurality of function icons in either the upper end region or the lower end region of the second window based on the determination that the display state of the display screen is the longitudinal state, determine that the second window reaches a predetermined range from a left end or a right end of the display screen, and change a display order of the plurality of function icons in the end region based on the determination that the second window reaches the predetermined range from the left end or the right end of the display screen.

12. The information processing device according to claim 1, wherein the processing circuitry is configured to:

make a notification to the user while the application screen is being displayed, determine that the user performs an operation of performing display related to the notification after the notification to the user is made, display, in a superimposed manner on the application screen, the first window in which display related to the notification is performed while maintaining the application screen based upon the determination that the user performs the operation of performing display related to the notification after the notification to the user is made.

13. The information processing device according to claim 1, wherein the processing circuitry is configured to display a user interface for opening an application in the second display mode, the user interface displays a first box representing a display region of the application screen and a second box representing the second window, an icon of a selected application selected by the user by an operation by the user is configured to be displayed in the second box, and the processing circuitry is configured to determine that a display operation of the icon in the second box is performed, and display, in a superimposed manner on the application screen, the second window in which display related to the selected application is performed based on the determination that the display operation of the icon in the second box is performed.

14. An information processing method comprising:

displaying an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and the method further includes displaying a first window having a fixed position and a fixed size as the application window in the first display mode, displaying a second window having a variable position and a variable size as the application window in the second display mode, displaying one or a plurality of function icons related to a window operation in the application window, determining that at least the second window is focused, displaying the one or the plurality of function icons in any one of an upper end region, a lower end region, a left end region, and a right end region of an end region of the second window based on the determination that the at least the second window is focused, moving a position of the second window based on a movement operation, by the user, for moving the second window, the movement operation being an operation using a non-display region where no function icon is displayed in the end region in which the one or the plurality of function icons is displayed, moving the second window beyond at least one of an upper end, a lower end, a left end, and a right end of the display screen so that at least part of the non-display region remains in the display screen, changing a display order of the plurality of function icons in the end region based on information related to a position of the second window in the display screen, determining that a display state of the display screen is a lateral state, displaying the plurality of function icons in either the left end region or the right end region of the second window based on the determination that the display state of the display screen is the lateral state, determining that the second window reaches a predetermined range from an upper end or a lower end of the display screen, and changing a display order of the plurality of function icons in the end region based on the determination that the second window reaches the predetermined range from the upper end or the lower end of the display screen.

15. A non-transitory computer readable medium storing a program which when executed causes a computer to perform a method, the method comprising:

displaying an application window in a superimposed manner on an application screen so that a user is allowed to visually recognize at least part of the application screen in a display screen based on an operation by the user, wherein a display mode of the application window includes at least a first display mode and a second display mode that are different in a display aspect of the application window, and the method further comprises displaying a first window having a fixed position and a fixed size as the application window in the first display mode, displaying a second window having a variable position and a variable size as the application window in the second display mode, displaying one or a plurality of function icons related to a window operation in the application window, determining that at least the second window is focused, displaying the one or the plurality of function icons in any one of an upper end region, a lower end region, a left end region, and a right end region of an end region of the second window based on the determination that the at least the second window is focused, moving a position of the second window based on a movement operation, by the user, for moving the second window, the movement operation being an operation using a non-display region where no function icon is displayed in the end region in which the one or the plurality of function icons is displayed, moving the second window beyond at least one of an upper end, a lower end, a left end, and a right end of the display screen so that at least part of the non-display region remains in the display screen, changing a display order of the plurality of function icons in the end region based on information related to a position of the second window in the display screen, determining that a display state of the display screen is a lateral state, displaying the plurality of function icons in either the left end region or the right end region of the second window based on the determination that the display state of the display screen is the lateral state, determining that the second window reaches a predetermined range from an upper end or a lower end of the display screen, and changing a display order of the plurality of function icons in the end region based on the determination that the second window reaches the predetermined range from the upper end or the lower end of the display screen.

* * * * *